United States Patent
Hoshina et al.

(10) Patent No.: US 7,356,630 B2
(45) Date of Patent: Apr. 8, 2008

(54) PROCESSOR CONTROL DEVICE FOR STOPPING PROCESSOR OPERATION

(75) Inventors: Shoji Hoshina, Kawasaki (JP);
Masakazu Isomura, Setagaya (JP);
Akinari Todoroki, Hachioji (JP)

(73) Assignee: Seiko Epson Corporation (JP)

( * ) Notice: Subject to any disclaimer, the term of this patent is extended or adjusted under 35 U.S.C. 154(b) by 47 days.

(21) Appl. No.: 11/375,670

(22) Filed: Mar. 14, 2006

(65) Prior Publication Data

US 2006/0212630 A1   Sep. 21, 2006

(30) Foreign Application Priority Data

Mar. 15, 2005   (JP)  ............................. 2005-072429
May  6, 2005    (JP)  ............................. 2005-134991

(51) Int. Cl.
G06F 9/30     (2006.01)
G06F 13/00    (2006.01)
G06F 15/76    (2006.01)
G06F 15/78    (2006.01)
G06F 1/30     (2006.01)

(52) U.S. Cl. ..................... 710/220; 713/300; 713/320; 710/47

(58) Field of Classification Search ................ 710/22, 710/47, 107, 109, 220, 308, 260; 712/17, 712/34, 41, 244; 713/320, 322, 501, 600, 713/300

See application file for complete search history.

(56) References Cited

U.S. PATENT DOCUMENTS 4,015,243 A  *  3/1977  Kurpanek et al. .......... 710/107
4,851,987 A  *  7/1989  Day .......................... 713/601
5,432,947 A  *  7/1995  Doi ........................... 713/320
5,555,413 A  *  9/1996  Lohman et al. ............. 710/260
6,324,599 B1 * 11/2001  Zhou et al. .................. 710/26
6,668,287 B1 * 12/2003  Boyle et al. ................. 710/22
6,985,980 B1 *  1/2006  Allegrucci .................. 710/107
6,993,674 B2    1/2006  Kitajima et al.
7,000,140 B2 *  2/2006  Okubo et al. ............... 713/601
2002/0073259 A1 * 6/2002  Grisenthwaite ............. 710/107
2006/0212630 A1 * 9/2006  Hoshina et al. ............. 710/109

FOREIGN PATENT DOCUMENTS

JP   08-083133     3/1996
JP   2004-199630   7/2004
JP   2005-158036   6/2005
JP   2005-228103   8/2005

OTHER PUBLICATIONS

"A continuous polling system with constant service times" by Coffman et al. (abstract only) Publication Date: Jul. 1986.*
Communication from Japanese Patent Office regarding related application.

* cited by examiner

Primary Examiner—Gopal C. Ray
(74) Attorney, Agent, or Firm—Harness, Dickey & Pierce, P.L.C.

(57) ABSTRACT

A processor control device includes a processor executing an instruction, a module coupled to the processor through a bus and processing independently from the processor, the module is provided in a plural number and a polling processing unit coupled to each module, the polling processing unit stopping an operation of the processor depending on an execution status of the module processing at a time of an access request from the processor.

8 Claims, 14 Drawing Sheets

| RISING EDGE | | | | |
|---|---|---|---|---|
| SS01 | 1 | 0 | 0 | 0 |
| SS02 | 0 | 1 | 0 | 0 |
| SSA1 | 0 | 0 | 1 | 0 |
| SSA2 | 0 | 0 | 0 | 1 |
| AOSLT | 1 | 1 | 0 | 0 |

| ADDRESS | REGISTER NAME |
|---|---|
| 0x10000014 | Multi wait status register |
| 0x10000018 | Single wait status register |

| ADDRESS | REGISTER NAME |
|---|---|
| 0x10000014 | wait status register |
| 0x10000018 | set wait status register |

PROCESSOR CONTROL DEVICE FOR STOPPING PROCESSOR OPERATION

BACKGROUND OF THE INVENTION

1. Technical Field

The present invention relates to a processor control device, more particularly, a processor control device in which hardware performs a polling processing.

2. Related Art

JP-A-8-83133 is an example of related art. The example discloses a technique for reducing power consumption of a central processing unit (CPU) by halting a clock signal provided to the CPU while a direct memory access (DMA) controller performs a DMA processing mode, in other words, while an I/O unit and a memory performs the DMA processing.

However, according to the hitherto known power saving technique, when a plurality of the DMAs exists and a DMA transfer is conducted, the CPU has to perform a polling processing by software and has to wait for the termination of the DMA transfer. Therefore, when the plurality of the DMAs exists and a plurality of the DMA transfers is simultaneously performed, the CPU needs to read a value in a status register, needs to determine a branch whose process is to be conducted based on the value in the status register, and needs to perform the branch process according to the value in the status register. The CPU has to repeat such operation until the DMA transfer is ended and this increases the CPU load.

SUMMARY

An advantage of the invention is to provide a processor control device which can perform the polling processing of a plurality of modules as well as preventing the load on the processor from increasing.

According to an aspect of the invention, a processor control device includes a processor executing an instruction, a module coupled to the processor through a bus and processing independently from the processor, the module is provided in a plural number and a polling processing unit coupled to each module, the polling processing unit stopping an operation of the processor depending on an execution status of the module processing at a time of an access request from the processor.

According to the aspect of the invention, it is possible to stop the operation of the processor until the processing of the module finishes, and the processor does not have to judge whether the processing of the module finished yet or not when the processor tries to access the module. Thereby, even in the case where more than one module is coupled to the processor through the bus, the processor does not need to judge which branch to process at the time of the polling processing and does not need to carry out the process of the branch. Accordingly, the processing load imposed on the processor can be reduced and it is possible to save the power consumed by the processor.

In this case, the processor control device may further include a clock control circuit supplying a clock signal to the processor, wherein the polling processing unit outputs a polling signal to the clock control circuit if the module is executing the processing when the module receive the access request from the processor. The polling signal is for stopping the clock signal supplied to the processor.

In this way, the module can stop the operation of the processor even if the module is in operation when the processor tries to access the module. Consequently, the processing load imposed on the processor can be reduced and it is possible to save the power consumed by the processor.

In this case, the module may include a single wait status register that assigns a setting to stop the operation of the processor based on the execution status of the module and a multi wait status register that assigns a setting to stop the operation of the processor based on execution statuses of the plurality of the modules.

In this way, it is possible to assign a setting to stop the operation of the processor depending on the condition that the processor can only go to the next process when the execution results of the plurality of the modules come out or that the processor can work on the next process without waiting the execution results of the plurality of the modules. Thereby, even in the case where the plurality of the modules is coupled to the processor through the bus, it is possible to prevent the operation of the processor from being uniformly stopped depending on the execution status of the single module. Therefore, the operation efficiency of the processor will not be deteriorated and the power consumption by the processor will be reduced.

The processor control device may further include a polling selector enabling or disabling the polling signal outputted from the polling processing unit based on the setting of the single wait status register or the multi wait status register.

In this way, even in the case where the plurality of the modules is coupled to the processor through the bus, each module can either stop the operation of the processor independently or the plurality of the modules can stop the operation of the processor in cooperation. Accordingly, it is possible to prevent the operation of the processor from being uniformly stopped when each module is individually operating. Therefore, the operation efficiency of the processor will not be deteriorated and the power consumption by the processor will be reduced.

In this case, the module may output a single wait selection signal to the polling selector in case where the processor reads out the single wait status register while the module is executing the processing. The single wait selection signal notifies that the single wait status register is read out. The module may also output a multi wait selection signal to the polling selector in case where the processor reads out the multi wait status register while the module is executing the processing. The multi wait selection signal notifies that the multi wait status register is read out. The polling selector may output a wait signal to the clock control circuit based on the polling signal outputted from the module in case where the single wait selection signal is sent from the module, the wait signal is for stopping the clock signal, and the polling selector may output the wait signal to the clock control circuit based on the polling signals outputted from the plurality of the modules in case where the multi wait selection signal is sent from the module.

In this way, it is possible to output the wait signal that halts outputting the clock signal to the clock control circuit according to the conditions that the processor read out the single wait status register or the multi wait status register. Thereby, the module can either stop or continue the operation of the processor even when the single module is executing the processing. Accordingly, even in the case where the plurality of the modules is coupled to the processor through the bus, it is possible to prevent the operation of the processor from being uniformly stopped based on the execution status of the individual module. Therefore, the operation efficiency of the processor will not be deteriorated and the power consumption by the processor will be reduced.

Furthermore, according to the aspect of the invention, the module may include a wait status register that assigns a setting to stop the operation of the processor based on the execution status of the module and a set wait status register that assigns a setting to continue the operation of the processor regardless of the execution status of the module.

In this way, it is possible to assign a setting to the module to stop the operation of the processor depending on the condition that the processor has to wait the execution result of the module to go to the next process or that the processor can work on the next process without waiting the execution result of the module. Thereby, even in the case where the plurality of the modules is coupled to the processor through the bus, it is possible to prevent the operation of the processor from being uniformly stopped depending on the execution status of the single module. Therefore, the operation efficiency of the processor will not be deteriorated and the power consumption by the processor will be reduced.

In this case, the processor control device may further include a polling selector enabling or disabling the polling signal outputted from the polling processing unit based on the setting of the wait status register or the set wait status register.

In this way, even in the case where the plurality of the modules is coupled to the processor through the bus, it is possible to stop or continue the operation of the processor depending on an execution status of a specific module. Accordingly, it is possible to prevent the operation of the processor from being uniformly stopped when each module is individually operating. Therefore, the operation efficiency of the processor will not be deteriorated and the power consumption by the processor will be reduced.

In this case, the module outputs a wait selection signal to the polling selector in case where the processor reads out the wait status register while the module is executing the processing, the wait selection signal notifies that the wait status register is read out, the module outputs a set wait selection signal to the polling selector in case where the processor reads out the set wait status register while the module is executing the processing, the set wait selection signal notifies that the set wait status register is read out, the polling selector outputs a wait signal to the clock control circuit based on the polling signal outputted from the module in case where the wait selection signal is sent from the module, the wait signal is for stopping the clock signal, and the polling selector prohibits the output of the wait signal to the clock control circuit regardless of the execution status of the module in case where the set wait selection signal is sent from the module.

In this way, it is possible to output the wait signal that halts outputting the clock signal to the clock control circuit depending on the conditions that the processor read out the wait status register or the set wait status register. Thereby, the module can either stop or continue the operation of the processor even when the module is individually executing the processing. Accordingly, even in the case where the plurality of the modules is coupled to the processor through the bus, it is possible to prevent the operation of the processor from being uniformly stopped based on the execution status of the individual module. Therefore, the operation efficiency of the processor will not be deteriorated and the power consumption by the processor will be reduced.

BRIEF DESCRIPTION OF THE DRAWINGS

The invention will be described with reference to the accompanying drawings, wherein like numbers reference like elements.

DESCRIPTION OF THE EMBODIMENTS

Figure 1:
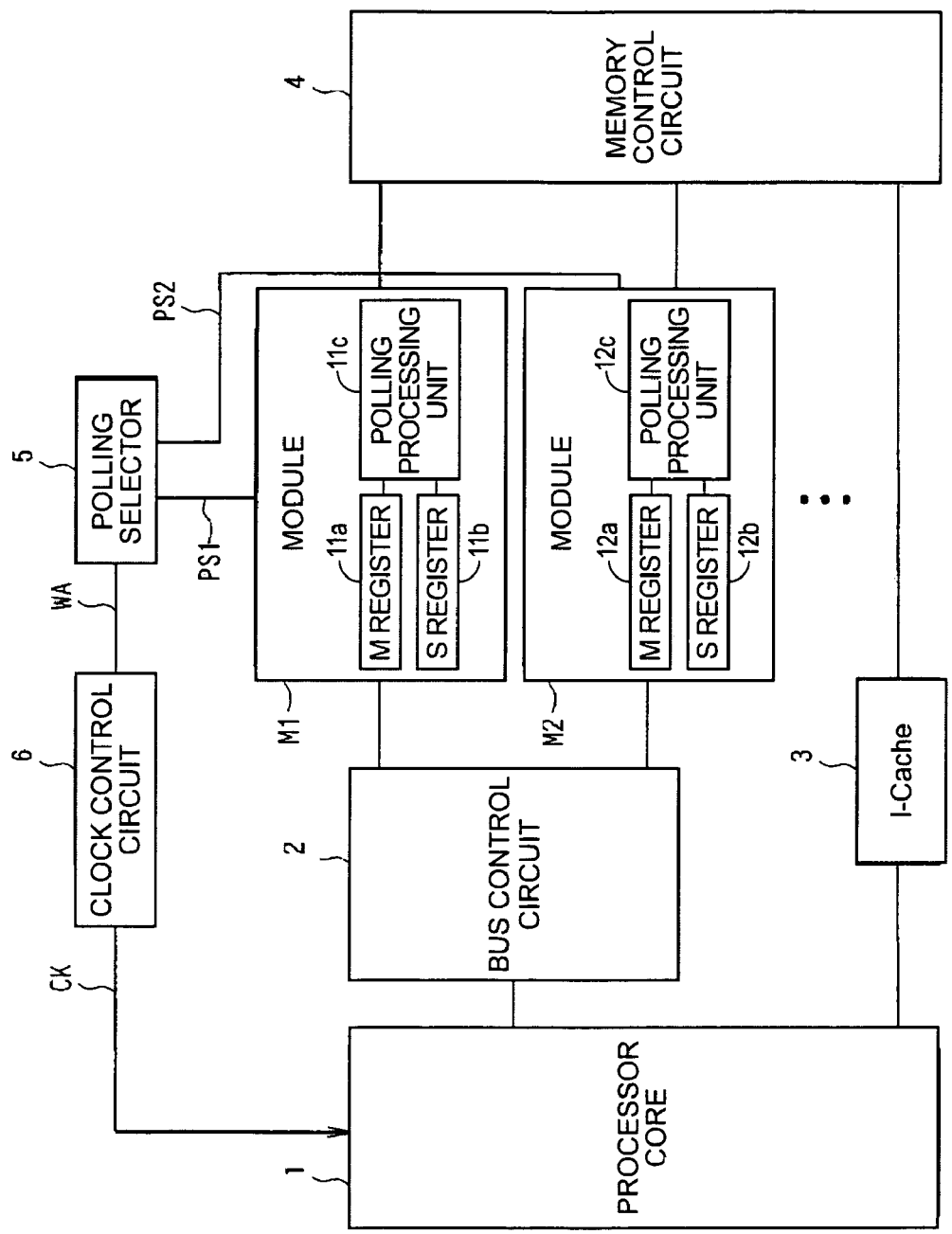
FIG. 1 is a block diagram showing a structure of a processor control device according to a first embodiment of the invention.

FIG. 1 is a block diagram showing a structure of a processor control device according to a first embodiment of the invention.

As shown in FIG. 1, a processor core 1 is coupled to an instruction cache 3. The instruction cache 3 can obtain instructions that should be executed by the processor core 1 by accessing a memory through a memory control circuit 4. The instruction cache 3 then outputs the instructions to the processor core 1. The processor core 1 can execute a program in which the instructions are written by carrying out the instructions outputted from the instruction cache 3.

The processor core 1 is coupled to modules M1, M2 through a bus control circuit 2. The modules M1, M2 are also coupled to the memory control circuit 4. Peripheral circuits that can execute processing independently from the processor core 1 such as a direct memory access (DMA) controller and an I/O controller can be used as the modules M1, M2.

In the modules M1, M2, multi wait status registers 11a, 12a and single wait status registers 11b, 12b and polling processing units 11c, 12c are provided. The multi wait status registers 11a, 12a in the modules M1, M2 can assign settings that stop the operation of the processor core 1 based on the execution statuses of the modules M1, M2. The single wait status registers 11b, 12b in the modules M1, M2 can assign settings that stop the operation of the processor core 1 based on the execution status of the corresponding module M1, M2. The polling processing units 11c, 12c can respectively output polling signals PS1, PS2 that feed the operation of the processor core 1 when the module M1, M2 receive an access request from the processor core 1 and the modules M1, M2 are in execution of processing.

A polling selector 5 and a clock control circuit 6 are also provided in the processor control device. The polling selector 5 enables or disables the polling signals PS1, PS2 outputted from the polling processing units 11c, 12c based on the settings by the multi wait status registers 11a, 12a or the single wait status registers 11b, 12b. The polling selector 5 can output a wait signal WA that halts a clock signal CL outputted to the processor core 1 by enabling or disabling the polling signal. The clock control circuit 6 can supply a clock signal CK to the processor core 1. The clock control circuit 6 can also stop the clock signal CL that is supplied to the processor core 1 according to the wait signal WA outputted from the polling selector 5.

Figure 2:
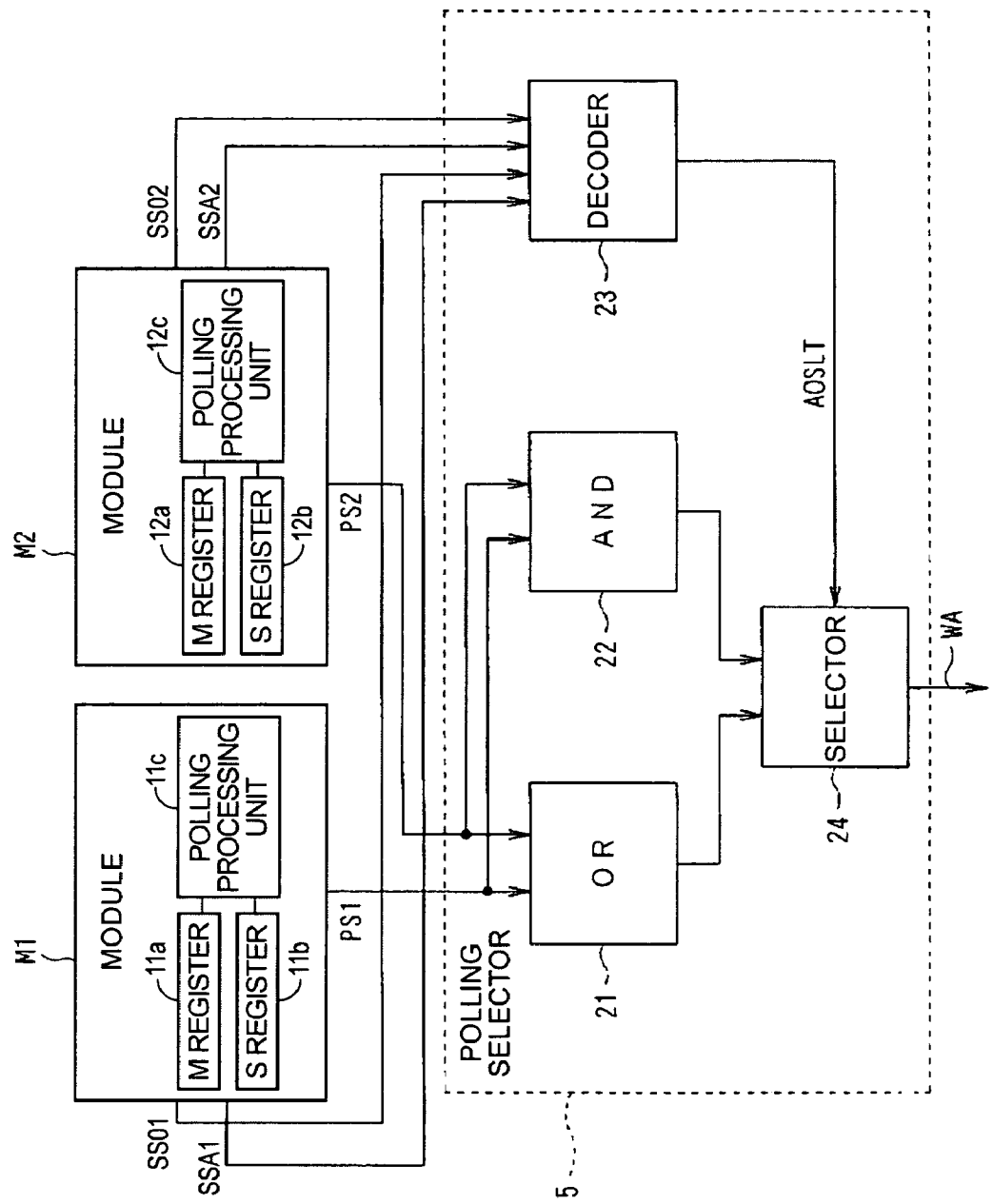
FIG. 2 is a block diagram showing a schematic structure of a polling selector 5 shown in FIG. 1.

FIG. 2 is a block diagram showing a schematic structure of the polling selector 5 shown in FIG. 1.

As shown in FIG. 2, an OR circuit 21, an AND circuit 22, a decoder 23 and a selector 24 are provided in the polling selector 5. The polling signals PS1, PS2 outputted from the modules M1, M2 are inputted into the OR circuit 21. The OR circuit 21 calculates a logical sum of the polling signal PS1 and the polling signal PS2, and then outputs the result to the selector 24. The polling signals PS1, PS2 outputted from the modules M1, M2 are also inputted into the AND circuit 22. The AND circuit 22 calculates a logical product of the polling signal PS1 and the polling signal PS2, and then outputs the result to the selector 24.

The modules M1, M2 output multi wait selection signals SSA1, SSA2 to the decoder 23. The multi wait selection signals SSA1, SSA2 correspondingly indicate that the multi wait status registers 11a, 12a are read out by the processor core 1. The modules M1, M2 also output single wait selection signals SSO1, SSO2 to the decoder 23. The single wait selection signals SSO1, SSO2 correspondingly indicate that the single wait status registers 11b, 12b are read out by the processor core 1.

The decoder 23 supplies a selection signal AOSLT to the selector 24 when at least one of the multi wait selection signals SSA1, SSA2 is sent by the modules M1, M2. With the selection signal AOSLT, the selector 24 selects the output of the AND circuit 22. The decoder 23 also supplies the selection signal AOSLT to the selector 24 when at least one of the single wait selection signals SSO1, SSO2 is sent by the modules M1, M2. With the selection signal AOSLT, the selector 24 selects the output of the OR circuit 21.

The selector 24 selects the output of either the OR circuit 21 or the AND circuit 22 based on the selection signal AOSLT outputted from the decoder 23. The selector 24 then outputs the selected output to the clock control circuit 6 as the wait signal WA.

Figures 3, 4:
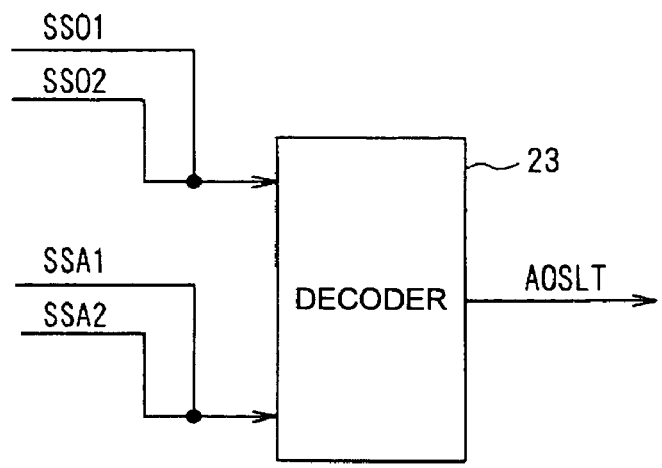
FIG. 3 is a drawing showing operation of a decoder 23 shown in FIG. 2.
FIG. 4 is a drawing showing a method for selecting multi wait status registers 11a, 12a and single wait status registers 11b, 12b.

FIG. 3 is a drawing showing the operation of the decoder 23 shown in FIG. 2.

As shown in FIG. 3, when the multi wait status registers 11a, 12a are read by the processor core 1, the polling processing units 11c, 12c set the multi wait selection signals SSA1, SSA2 to "1". The decoder 23 then sets the selection signal AOSLT to "0" when at least one of the multi wait selection signals SSA1, SSA2 is set to "1". The selector 24 outputs the output of the AND circuit 22 to the clock control circuit 6 as the wait signal WA when the selection signal AOSLT is set to "0".

On the other hand, when the single wait status registers 11b, 12b are read by the processor core 1, the polling processing units 11c, 12c set the single wait selection signals SSO1, SSO2 to "1". The decoder 23 then sets the selection signal AOSLT to "1" when at least one of the single wait selection signals SSO1, SSO2 is set to "1". The selector 24 outputs the output of the OR circuit 21 to the clock control circuit 6 as the wait signal WA when the selection signal AOSLT is set to "1".

FIG. 4 is a drawing showing a method for selecting the multi wait status registers 11a, 12a and the single wait status registers 11b, 12b shown in FIG. 1.

As shown in FIG. 4, for example, the multi wait status registers 11a, 12a and the single wait status registers 11b, 12b may correspond to address lines of the bus. For example, the processor core 1 can select the multi wait status registers 11a, 12a by addressing "0x1000014" in the bus address lines. The processor core 1 can also select the single wait status registers 11b, 12b by addressing "0x1000018" in the bus address lines.

When an access request is sent from the processor core 1 to the modules M1, M2 as shown in FIG. 1, the polling processing units 11c, 12c judge whether the modules M1, M2 are executing a process or not. If the modules M1, M2 are not executing the process, a non-execution flag informing that the modules M1, M2 are not running the process is read by the processor core 1. The processor core 1 can access the modules M1, M2 when it reads out the non-execution flag from the modules M1, M2.

On the contrary, if the polling processing units 11c, 12c find that the modules M1, M2 are executing the process when the access request from the processor core 1 is sent to the modules M1, M2, the polling processing units 11c, 12c can respectively output the polling signals PS1, PS2 to the polling selector 5. Here, the processor core 1 can select and read out either the multi wait status registers 11a, 12a or the single wait status registers 11b, 12b at the time of the access request to the modules M1, M2. In a case where the processor core 1 has to wait results of other modules' processing besides the modules M1, M2 to which the access request has sent in order to work on a next process, the processor core 1 can read out the multi wait status registers 11a, 12a. Alternatively, in a case where the processor core 1 can go to the next process without waiting the results of other modules' processing as long as it has the processing results of the modules M1, M2 to which the access request has sent, the processor core 1 can read out the single wait status registers 11b, 12b.

If the multi wait status registers 11a, 12a are read out by the processor core 1, the polling processing units 11c, 12c set the multi wait selection signals SSA1, SSA2 to "1" as shown in FIG. 3. The decoder 23 then sets the selection signal AOSLT to "0" when at least one of the multi wait selection signals SSA1, SSA2 is set to "1". The selector 24 outputs the output of the AND circuit 22 to the clock control circuit 6 as the wait signal WA when the selection signal AOSLT is set to "1".

On the other hand, when the single wait status registers 11b, 12b are read by the processor core 1, the polling processing units 11c, 12c set the single wait selection signals SSO1, SSO2 to "1". The decoder 23 then sets the selection signal AOSLT to "1" when at least one of the single wait selection signals SSO1, SSO2 is set to "1". The selector 24 outputs the output of the OR circuit 21 to the clock control circuit 6 as the wait signal WA when the selection signal AOSLT is set to "1".

When the wait signal WA is outputted to the clock control circuit 6, the clock control circuit 6 stops the clock signal CL that is supplied to the processor core 1. The polling processing units 11c, 12c monitor the execution status of the own modules M1, M2. When the modules M1, M2 finish the processing, the polling processing units 11c, 12c correspondingly stop outputting the polling signals PS1, PS2.

In the case where the multi wait status registers 11a, 12a were read out by the processor core 1, the polling selector 5 then stops outputting the wait signal WA when all the outputs of the polling signals PS1, PS2 from the modules M1, M2 are stopped.

In the case where the single wait status registers 11b, 12b were read out by the processor core 1, the polling selector 5 stops outputting the wait signal WA when the output of the polling signals PS1, PS2 from the corresponding modules M1, M2 is stopped. The clock control circuit 6 starts supplying the clock signal CL to the processor core 1 again when the polling selector 5 stops outputting the wait signal WA.

As described above, according to the embodiment, it is possible to stop the operation of the processor core 1 until the processing of the modules M1, M2 finishes, and the processor core 1 does not have to judge whether the processing of the modules M1, M2 finished yet or not when the processor core 1 tries to access the modules M1, M2. Thereby, even in the case where more than one module, the modules M1, M2 are coupled to the processor core 1 through the bus, the processor core 1 does not need to judge which branch to process at the time of the polling processing and does not need to carry out the process of the branch. Accordingly, the processing load imposed on the processor core 1 can be reduced and it is possible to save the power consumed by the processor core 1.

Furthermore, according to the embodiment, the single wait status registers 11b, 12b that assign settings to stop the operation of the processor core 1 based on the execution status of the individual module M1, M2, and the multi wait status registers 11a, 12a that assign settings to stop the operation of the processor core 1 based on the execution statuses of the plurality of the modules M1, M2 are provided in each module M1, M2. Thereby, each module M1, M2 can either stop the operation of the processor core 1 independently or can stop the operation of the processor core 1 in cooperation even if the plurality of the modules M1, M2 is coupled to the processor core 1 through the bus. Accordingly, it is possible to prevent the operation of the processor core 1 from being uniformly stopped when each module M1, M2 is independently operating. Therefore, operation efficiency of the processor core 1 will not be deteriorated and the power consumption by the processor core 1 will be reduced.

Figure 5:
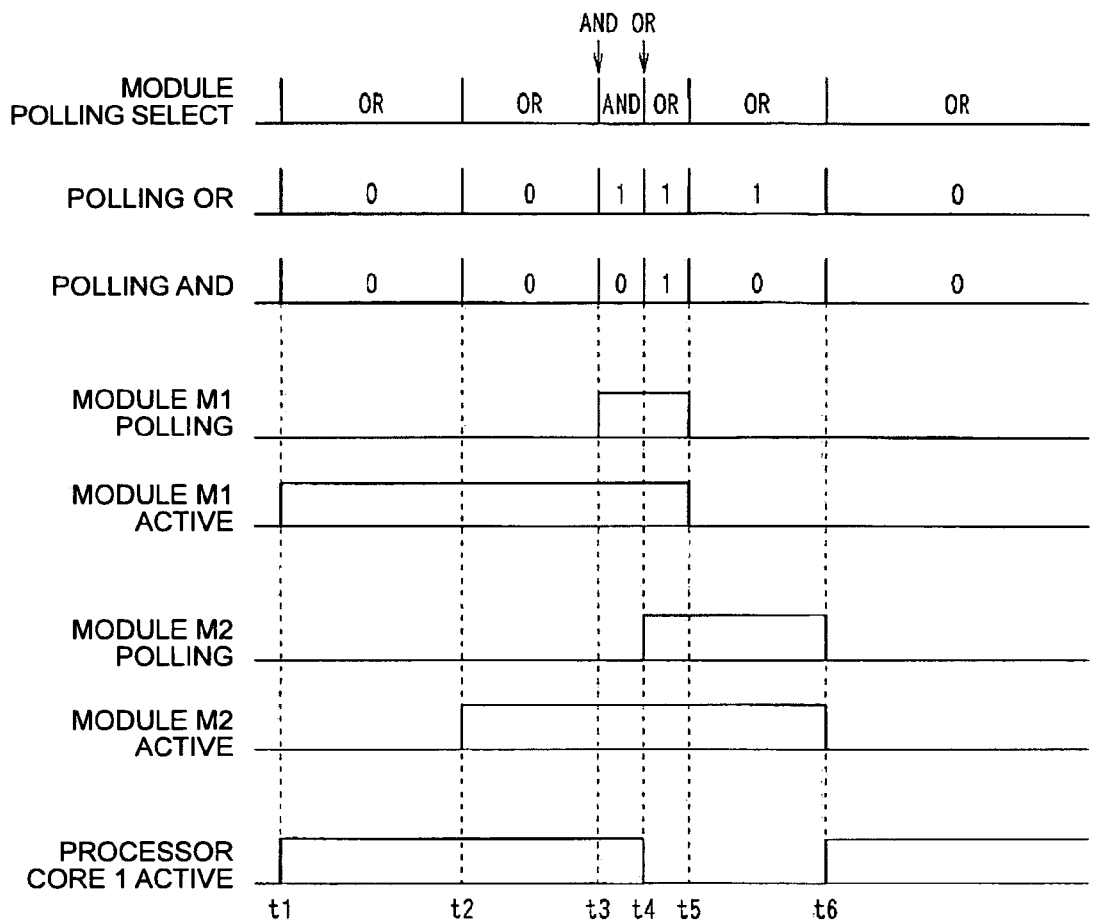
FIG. 5 is a drawing showing an example of a polling processing method of the processor control device shown in FIG. 1.

FIG. 5 is a timing chart showing an example of a polling processing method of the processor control device shown in FIG. 1.

At a time t1 shown in FIG. 5, the processor core 1 shown in FIG. 1 is in operation and the module M1 is executing the processing. At a time t2, the module M2 starts processing. At a time t3, the processor core 1 issues an access request to the module M1 and then reads out the multi wait status register 11a while the modules M1, M2 are executing the processing.

Subsequently, the polling processing unit 11c in the module M1 outputs the polling signal PS1 to the polling selector 5 and sets the multi wait selection signal SSA1 to "1". The decoder 23 sets the selection signal AOSLT to "0" when the multi wait selection signal SSA1 is set to "1". The selector 24 outputs the output of the AND circuit 22 to the clock control circuit 6 as the wait signal WA when the selection signal AOSLT is set to "0". At this point, the polling signal PS2 is not outputted to the polling selector 5 though the polling signal PS1 is outputted to the polling selector 5. Accordingly, the output of the AND circuit 22 becomes "0" and the wait signal WA will not be outputted to the clock control circuit 6. Thereby, at the time t3, the clock control circuit 6 keeps supplying the clock signal CL to the processor core 1 and the processor core 1 remains in operation.

Next, the processor core 1 issues the access request to the module M2 while the modules M1, M2 are executing the processing, and then the processor core 1 reads out the single wait status register 12b at a time t4.

The polling processing unit 12c in the module M2 then outputs the polling signal PS2 to the polling selector 5 and sets the single wait selection signal SSO2 to "1". The decoder 23 sets the selection signal AOSLT to "1" when the single wait selection signal SSO2 is set to "1". The selector 24 outputs the output of the OR circuit 21 to the clock control circuit 6 as the wait signal WA when the selection signal AOSLT is set to "1". At this point, the output of the OR circuit 21 becomes "1" when the polling signal PS2 is outputted to the polling selector 5 and the wait signal WA is outputted to the clock control circuit 6. Thereby, the clock control circuit 6 stops the clock signal CL supplied to the processor core 1 at the time t4, and this stops the operation of the processor core 1.

Next, when the processing of the module M1 finishes, the polling processing unit 11c stops outputting the polling signal PS1 at a time t5. Even though the output of the polling signal PS1 from the module M1 is stopped here, the polling signal PS2 is still outputted from the module M2. Thereby, the output from the OR circuit 21 remains "1". Furthermore, the output of the OR circuit 21 is outputted to the clock control circuit 6 as the wait signal WA because the single wait selection signal SSO2 is set to "1". Accordingly, the supply of the clock signal CL that is provided to the processor core 1 from the clock control circuit 6 is kept halting even when the processing of the module M1 finishes, and the operation of the processor core 1 remains suspended.

Next, when the processing of the module M2 finishes, the polling processing unit 12c stops outputting the polling signal PS2 at a time t6. When the output of the polling signal PS2 from the module M2 is ceased, the output form the OR circuit 21 becomes "0". This halts the wait signal WA outputted from the clock control circuit 6. Thereby, the clock control circuit 6 resumes supplying the clock signal CL to the processor core 1 at the time t6 and this starts the operation of the processor core 1.

Figure 6:
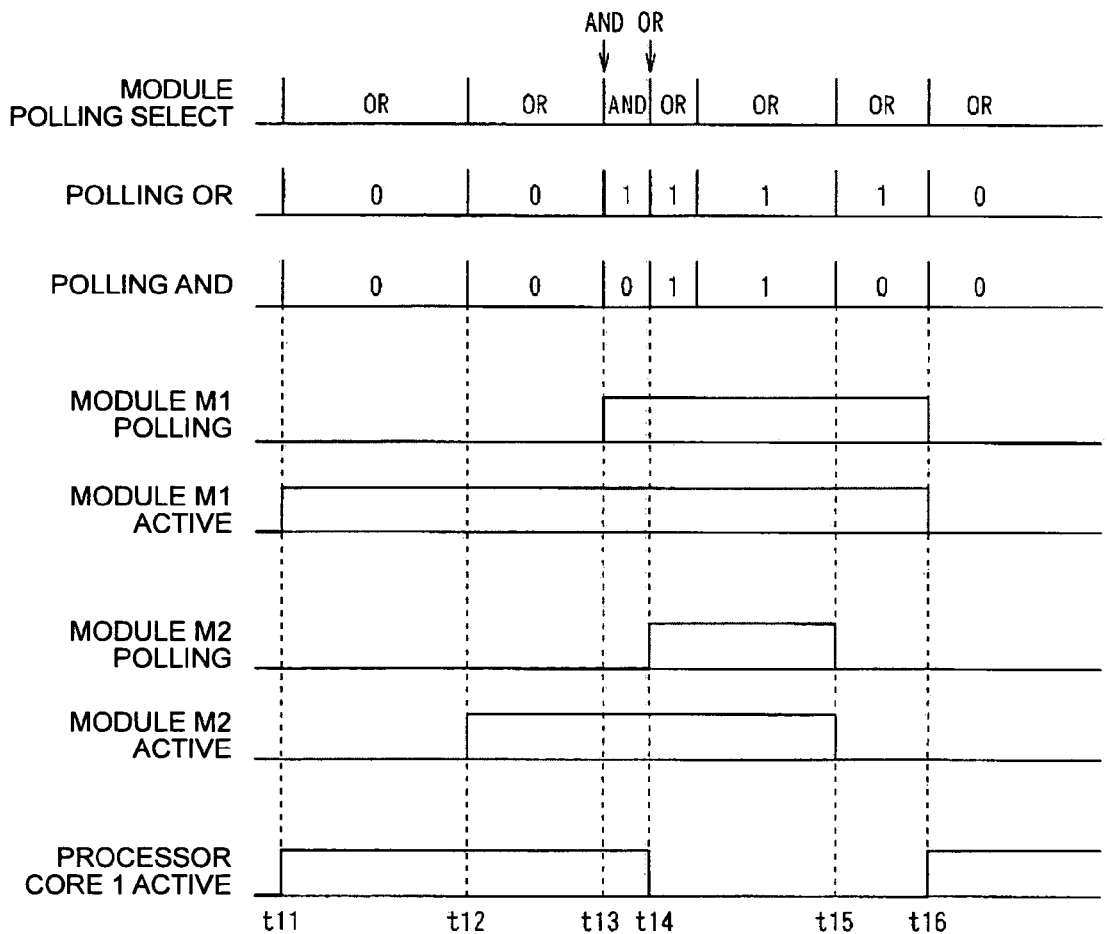
FIG. 6 is a drawing showing another example of the polling processing method of the processor control device shown in FIG. 1.

FIG. 6 is a timing chart showing another example of the polling processing method of the processor control device shown in FIG. 1.

At a time t11 shown in FIG. 6, the processor core 1 shown in FIG. 1 is in operation and the module M1 is executing the processing. At a time t12, the module M2 starts processing. At a time t13, the processor core 1 issues an access request to the module M1 and then reads out the multi wait status register 11a while the modules M1, M2 are executing the processing.

Subsequently, the polling processing unit 11c in the module M1 outputs the polling signal PS1 to the polling selector 5 and sets the multi wait selection signal SSA1 to "1". The decoder 23 sets the selection signal AOSLT to "0" when the multi wait selection signal SSA1 is set to "1". The selector 24 outputs the output of the AND circuit 22 to the clock control circuit 6 as the wait signal WA when the selection signal AOSLT is set to "0". At this point, the polling signal PS2 is not outputted to the polling selector 5 though the polling signal PS1 is outputted to the polling selector 5. Accordingly, the output of the AND circuit 22 becomes "0" and the wait signal WA will not be outputted to the clock control circuit 6. Thereby, at the time t13, the clock control circuit 6 keeps supplying the clock signal CL to the processor core 1 and the processor core 1 remains in operation.

Next, the processor core 1 issues the access request to the module M2 while the modules M1, M2 are executing the processing, and then the processor core 1 reads out the single wait status register 12b at a time t14.

The polling processing unit 12c in the module M2 then outputs the polling signal PS2 to the polling selector 5 and sets the single wait selection signal SSO2 to "1". The decoder 23 sets the selection signal AOSLT to "1" when the single wait selection signal SSO2 is set to "1". The selector 24 outputs the output of the OR circuit 21 to the clock control circuit 6 as the wait signal WA when the selection signal AOSLT is set to "1". At this point, the output of the OR circuit 21 becomes "1" when the polling signal PS2 is outputted to the polling selector 5 and the wait signal WA is outputted to the clock control circuit 6. Thereby, the clock control circuit 6 stops the clock signal CL supplied to the processor core 1 at the time t14, and this halts the operation of the processor core 1.

Next, when the processing of the module M2 finishes, the polling processing unit 12c stops outputting the polling signal PS2 at a time t15. Even though the output of the polling signal PS2 from the module M2 is stopped here, the polling signal PS1 is still outputted from the module M1. Thereby, the output from the OR circuit 21 remains "1". Furthermore, the output of the OR circuit 21 is outputted to the clock control circuit 6 as the wait signal WA because the single wait selection signal SSO2 is set to "1". Accordingly, the supply of the clock signal CL that is provided to the processor core 1 from the clock control circuit 6 is still halted even when the processing of the module M2 finishes, and the operation of the processor core 1 remains suspended.

Next, when the processing of the module M1 finishes, the polling processing unit 11c stops outputting the polling signal PS1 at a time t16. When the output of the polling signal PS1 from the module M1 is ceased, the output form the OR circuit 21 becomes "0". This halts the wait signal WA outputted from the clock control circuit 6. Thereby, the clock control circuit 6 resumes supplying the clock signal CL to the processor core 1 at the time t16 and this starts the operation of the processor core 1.

Figure 7:
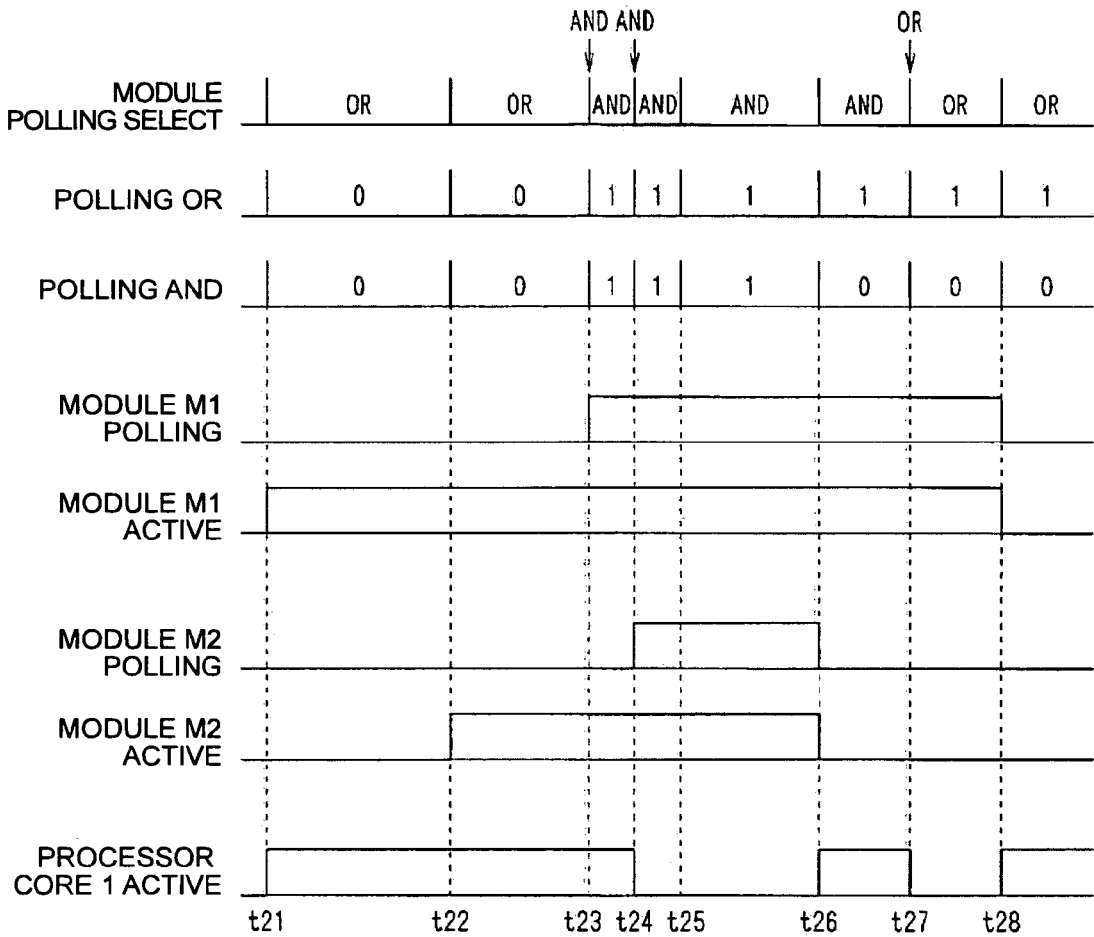
FIG. 7 is a drawing showing another example of the polling processing method of the processor control device shown in FIG. 1.

FIG. 7 is a timing chart showing another example of the polling processing method of the processor control device shown in FIG. 1.

At a time t21 shown in FIG. 7, the processor core 1 shown in FIG. 1 is in operation and the module M1 is executing the processing. At a time t22, the module M2 starts processing. At a time t23, the processor core 1 issues an access request to the module M1 and then reads out the multi wait status register 11a while the modules M1, M2 are executing the processing.

Subsequently, the polling processing unit 11c in the module M1 outputs the polling signal PS1 to the polling selector 5 and sets the multi wait selection signal SSA1 to "1". The decoder 23 sets the selection signal AOSLT to "0" when the multi wait selection signal SSA1 is set to "1". The selector 24 outputs the output of the AND circuit 22 to the clock control circuit 6 as the wait signal WA when the selection signal AOSLT is set to "0". At this point, the polling signal PS2 is not outputted to the polling selector 5 through the AND circuit 22 even though the polling signal PS1 is outputted to the polling selector 5. Accordingly, the output of the AND circuit 22 becomes "0" and the wait signal WA will not be outputted to the clock control circuit 6. Thereby, at the time t23, the clock control circuit 6 keeps supplying the clock signal CL to the processor core 1 and the processor core 1 remains in operation.

Next, the processor core 1 issues the access request to the module M2 while the modules M1, M2 are executing the processing, and then the processor core 1 reads out the multi wait status register 12a at a time t24.

The polling processing unit 12c in the module M2 then outputs the polling signal PS2 to the polling selector 5 and sets the multi wait selection signal SSA2 to "1". The decoder 23 sets the selection signal AOSLT to "0" when the multi wait selection signal SSA2 is set to "1". The selector 24 outputs the output of the AND circuit 22 to the clock control circuit 6 as the wait signal WA when the selection signal AOSLT is set to "0". At this point, the output of the AND circuit 22 becomes "1" when the polling signal PS2 is outputted to the polling selector 5 since the polling signal PS1 has been already outputted to the polling selector 5. Accordingly, the wait signal WA is outputted to the clock control circuit 6. Thereby, the clock control circuit 6 stops the clock signal CL supplied to the processor core 1 at the time t24, and this halts the operation of the processor core 1. If the modules M1, M2 are continuing the operation at a time t25 while the operation of the processor core 1 is stopped, the clock signal CL provided to the processor core 1 remains suspended and the operation of the processor core 1 is still ceased.

Next, when the processing of the module M2 finishes, the polling processing unit 12c stops outputting the polling signal PS2 at a time t26. At this point, the selection signal APSLT is set to "0" because the multi wait status registers 11a, 12a in the modules M1, M2 are read out. Accordingly, the output of the AND circuit 22 is outputted to the clock control circuit 6 as the wait signal WA. Thereby, the output from the AND circuit 22 becomes "0" when the output of the polling signal PS2 from the module M2 is halted. This ceases the output of the wait signal WA from the clock control circuit 6. Consequently, the clock control circuit 6 resumes supplying the clock signal CL to the processor core 1 at the time t26 and this starts the operation of the processor core 1.

Next, the processor core 1 reads out the single wait status register 11b in the module M1 at a time t27 while the module M1 is executing the processing.

Subsequently, the polling processing unit 11c in the module M1 sets the single wait selection signal SSO1 is set to "1". The decoder 23 sets the selection signal AOSLT to "1" when the single wait selection signal SSO1 is set to "1". The selector 24 outputs the output of the OR circuit 21 to the clock control circuit 6 as the wait signal WA when the selection signal AOSLT is set to "0". At this point, the module M1 keeps operating and the polling signal PS1 from the module M1 is still outputted to the polling selector 5. Accordingly, the output of the OR circuit 21 is "1". Thereby, the wait signal WA is outputted to the clock control circuit 6 when the output of the OR circuit 21 is outputted to the clock control circuit 6. As a result, the clock control circuit 6 stops supplying the clock signal CL to the processor core 1 at the time t27 and this ceases the operation of the processor core 1.

Next, when the processing of the module M1 finishes, the polling processing unit 11*c* stops outputting the polling signal PS1 at a time t28. The output of the OR circuit 21 becomes "0" when the output of the polling signal PS1 from the module M1 is halted. This ceases the output of the wait signal WA from the clock control circuit 6. Consequently, the clock control circuit 6 resumes supplying the clock signal CL to the processor core 1 at the time t28 and this starts the operation of the processor core 1.

Figure 8:
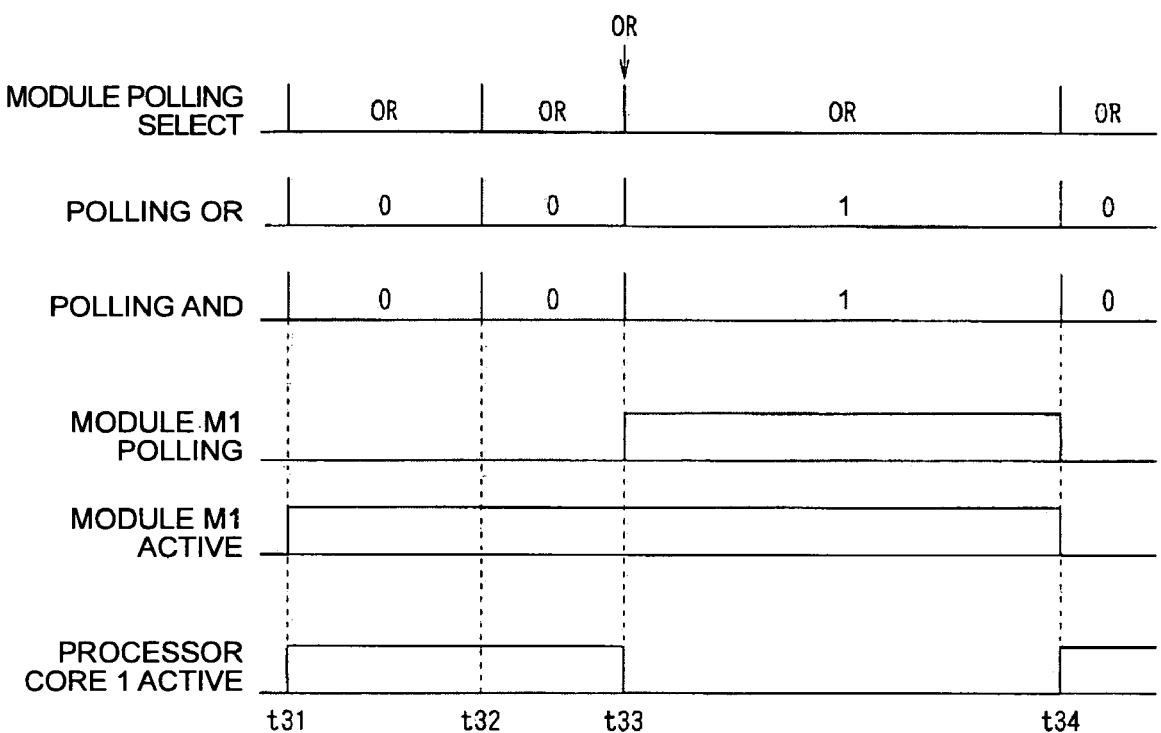
FIG. 8 is a drawing showing another example of the polling processing method of the processor control device shown in FIG. 1.

FIG. 8 is a timing chart showing another example of the polling processing method of the processor control device shown in FIG. 1.

At a time t31 shown in FIG. 8, the processor core 1 shown in FIG. 1 is in operation and the module M1 is executing the processing. At a time t32, the module M1 keeps executing the processing. At a time t33, the processor core 1 issues an access request to the module M1 while the module M1 is executing the processing, and then the processor core 1 reads out the single wait status register 11*b*.

Subsequently, the polling processing unit 11*c* in the module M1 outputs the polling signal PS1 to the polling selector 5 and sets the single wait selection signal SSO1 to "1". The decoder 23 sets the selection signal AOSLT to "1" when the single wait selection signal SSO1 is set to "1". The selector 24 outputs the output of the OR circuit 21 to the clock control circuit 6 as the wait signal WA when the selection signal AOSLT is set to "1". At this point, the output of the OR circuit 21 becomes "1" when the polling signal PS1 is outputted to the polling selector 5. Accordingly, the wait signal WA is outputted to the clock control circuit 6. Thereby, the clock control circuit 6 stops supplying the clock signal CL to the processor core 1 at the time t33 and this ceases the operation of the processor core 1.

Next, when the processing of the module M1 finishes, the polling processing unit 11*c* stops outputting the polling signal PS1 at a time t34. The output of the OR circuit 21 becomes "0" when the output of the polling signal PS1 from the module M1 is halted. This ceases the output of the wait signal WA from the clock control circuit 6. Consequently, the clock control circuit 6 resumes supplying the clock signal CL to the processor core 1 at the time t34 and this starts the operation of the processor core 1.

Figure 9:
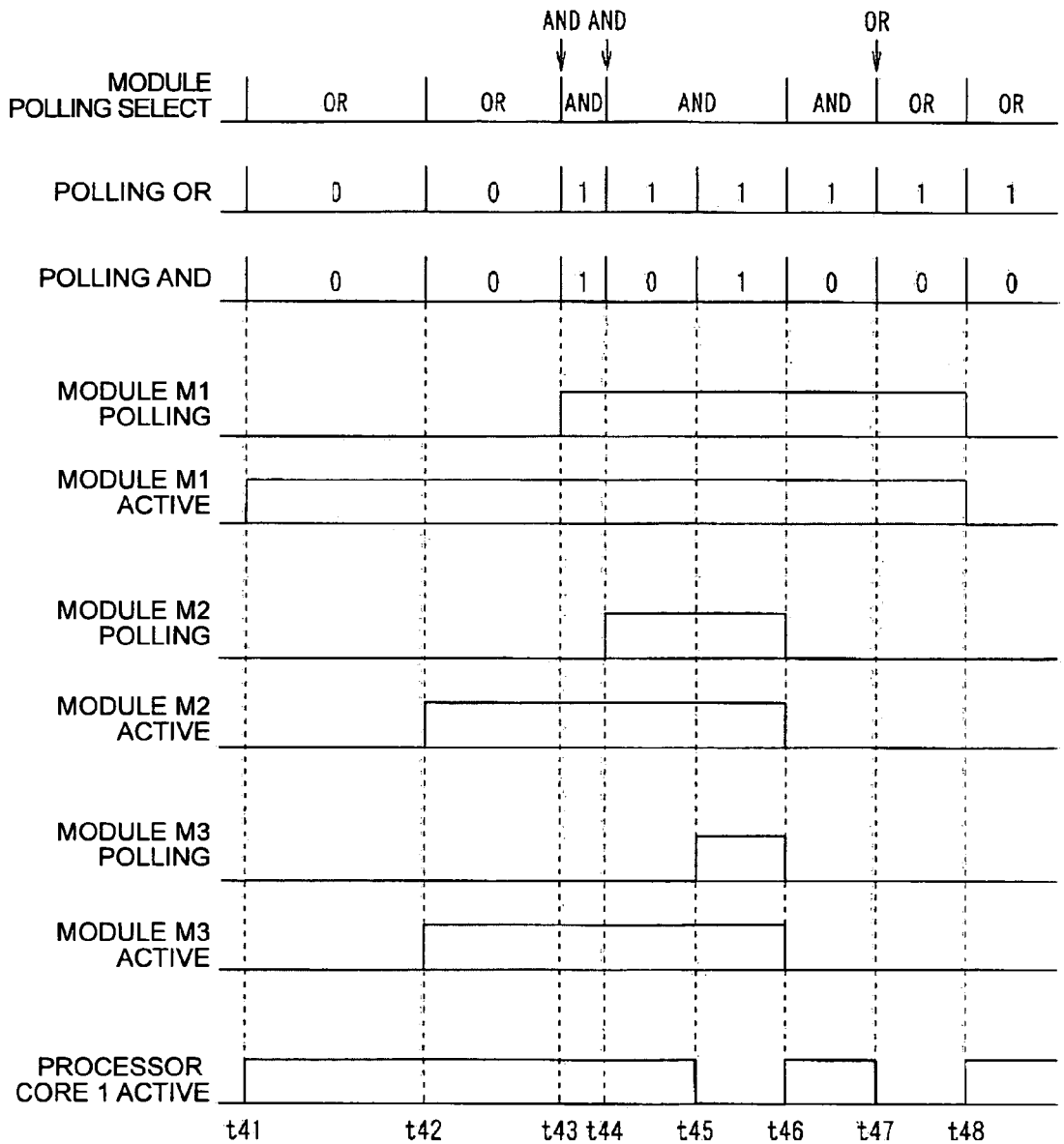
FIG. 9 is a drawing showing another example of the polling processing method of the processor control device shown in FIG. 1.

FIG. 9 is a timing chart showing another example of the polling processing method of the processor control device shown in FIG. 1. In the embodiment shown in FIG. 9, a module M3 is further provided in addition to the modules M1, M2 shown in FIG. 1. The module M3 has a multi wait status register 13*a*, a single wait status register 13*b* and a polling processing unit 13*c* just like the modules M1, M2 do. The module M3 outputs a polling signal PS3 to the OR circuit 21 and the AND circuit 22 shown in FIG. 2. The module M3 also outputs a multi wait selection signal SSA3 and a single wait selection signal SSO3 to the decoder 23.

At a time t41 shown in FIG. 9, the processor core 1 shown in FIG. 1 is in operation and the module M1 is executing the processing. At a time t42, the modules M2, M3 start executing the processing. At a time t43, the processor core 1 issues the access request to the module M1 while the modules M1, M2, M3 are executing the processing, and then the processor core 1 reads out the multi wait status register 11*a*.

Subsequently, the polling processing unit 11*c* in the module M1 outputs the polling signal PS1 to the polling selector 5 and sets the multi wait selection signal SSA1 to "1". The decoder 23 sets the selection signal AOSLT to "0" when the multi wait selection signal SSA1 is set to "1". The selector 24 outputs the output of the AND circuit 22 to the clock control circuit 6 as the wait signal WA when the selection signal AOSLT is set to "0". At this point, the output of the AND circuit 22 becomes "0" because the polling signals PS2, PS3 are not outputted to the polling selector 5 though the polling signal PS1 is outputted to the polling selector 5. Accordingly, the wait signal WA is not outputted to the clock control circuit 6. Thereby, at the time t43, the clock control circuit 6 keeps supplying the clock signal CL to the processor core 1 and the processor core 1 remains in operation.

Next, the processor core 1 issues the access request to the module M2 while the modules M1, M2, M3 are executing the processing, and then the processor core 1 reads out the multi wait status register 12*a* at a time t44.

The polling processing unit 12*c* in the module M2 then outputs the polling signal PS2 to the polling selector 5 and sets the multi wait selection signal SSA2 to "1". The decoder 23 sets the selection signal AOSLT to "0" when the multi wait selection signal SSA2 is set to "1". The selector 24 outputs the output of the AND circuit 22 to the clock control circuit 6 as the wait signal WA when the selection signal AOSLT is set to "0". At this point, the output of the AND circuit 22 becomes "0" because the polling signal PS3 is not outputted to the polling selector 5 though the polling signal PS2 is outputted to the polling selector 5. Accordingly, the wait signal WA is not outputted to the clock control circuit 6. Thereby, at the time t44, the clock control circuit 6 keeps supplying the clock signal CL to the processor core 1 and the processor core 1 remains in operation.

Next, the processor core 1 issues the access request to the module M3 at a time t45 while the modules M1, M2, M3 are executing the processing.

The output from the AND circuit 22 then becomes "1" when the polling signal PS3 is outputted to the polling selector 5 because the polling signals PS1, PS2 are already outputted to the polling selector 5. Accordingly, the wait signal WA is outputted to the clock control circuit 6. Thereby, the clock control circuit 6 stops supplying the clock signal CL to the processor core 1 at the time t45 and this ceases the operation of the processor core 1.

Next, when the processing of the modules M2, M3 finishes, the polling processing units 12*c*, 13*c* stop outputting the polling signals PS2, PS3 at a time t46. At this point, the selection signal APSLT is set to "0" because the multi wait status registers 11*a*, 12*a* in the modules M1, M2 are read out. Accordingly, the output of the AND circuit 22 is outputted to the clock control circuit 6 as the wait signal WA. Thereby, the output from the AND circuit 22 becomes "0" when the output of the polling signals PS2, PS3 from the modules M2, M3 are halted. This ceases the output of the wait signal WA from the clock control circuit 6. Consequently, the clock control circuit 6 resumes supplying the clock signal CL to the processor core 1 at the time t46 and this starts the operation of the processor core 1.

Next, at a time t47, the processor core 1 reads out the single wait status register 11*b* in the module M1 while the module M1 is executing the processing.

Subsequently, the polling processing unit 11c in the module M1 sets the single wait selection signal SSO1 to "1". The decoder 23 sets the selection signal AOSLT to "1" when the single wait selection signal SSO1 is set to "1". The selector 24 outputs the output of the OR circuit 21 to the clock control circuit 6 as the wait signal WA when the selection signal AOSLT is set to "1". At this point, the output of the OR circuit 21 is "1" because the module M1 is in operation and the polling signal PS1 from the module M1 is still outputted to the polling selector 5. Accordingly, the wait signal WA is outputted to the clock control circuit 6 when the output of the OR circuit 21 is outputted to the clock control circuit 6. Thereby, the clock control circuit 6 stops supplying the clock signal CL to the processor core 1 at the time t47 and this ceases the operation of the processor core 1.

Next, when the processing of the module M1 finishes, the polling processing unit 11c stops outputting the polling signal PS1 at a time t48. The output of the OR circuit 21 becomes "0" when the output of the polling signal PS1 from the module M1 is halted. This ceases the output of the wait signal WA from the clock control circuit 6. Consequently, the clock control circuit 6 resumes supplying the clock signal CL to the processor core 1 at the time t48 and this starts the operation of the processor core 1.

Figure 10:
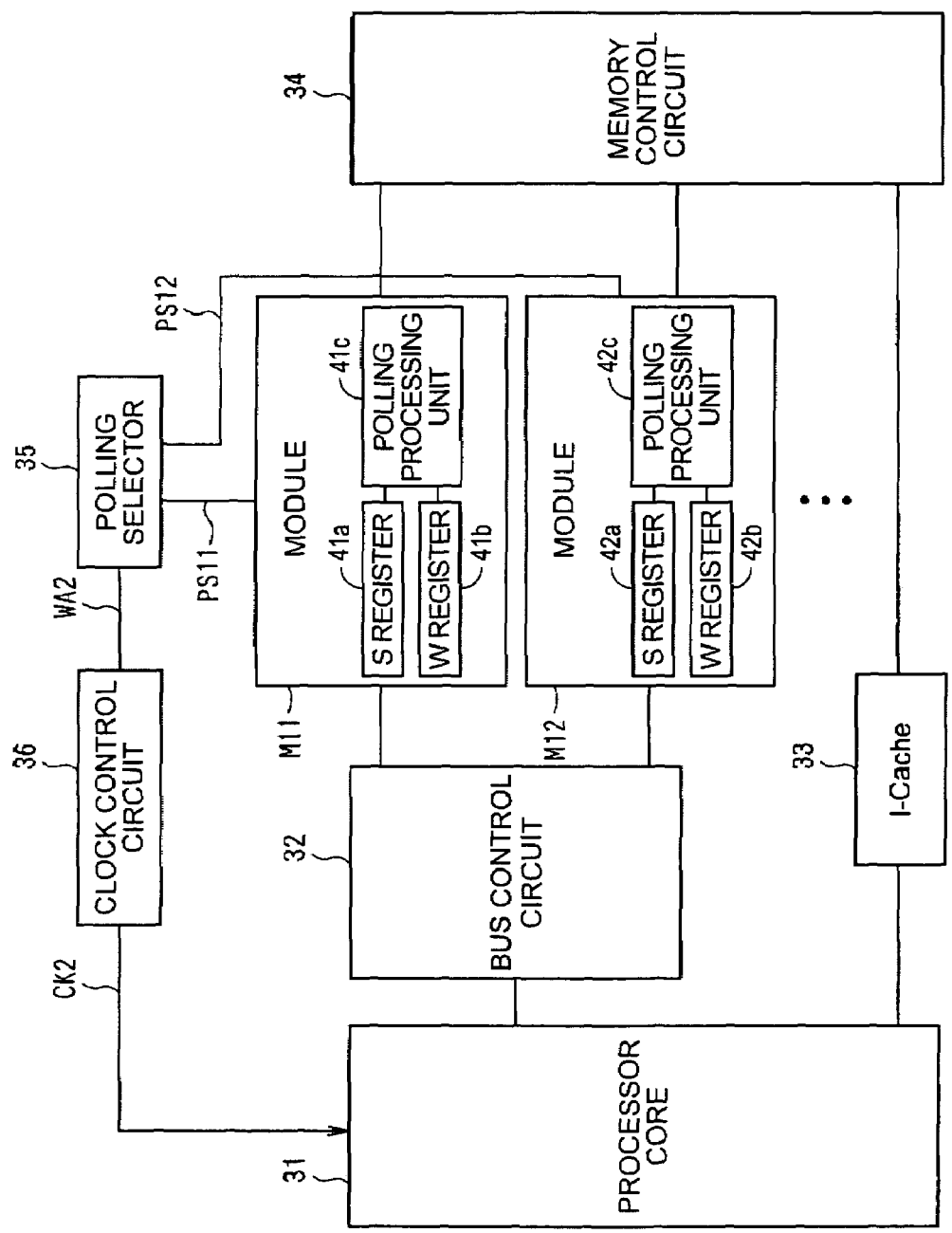
FIG. 10 is a block diagram showing a structure of a processor control device according to a second embodiment of the invention.

FIG. 10 is a block diagram showing a structure of a processor control device according to a second embodiment of the invention.

As shown in FIG. 10, a processor core 31 is coupled to an instruction cache 33. The instruction cache 33 can obtain instructions that should be executed by the processor core 31 by accessing a memory through a memory control circuit 34. The instruction cache 33 then outputs the instructions to the processor core 31. The processor core 31 can execute a program in which the instructions are written by carrying out the instructions outputted from the instruction cache 33.

The processor core 31 is coupled to modules M11, M12 through a bus control circuit 32. The modules M11, M12 are also coupled to the memory control circuit 34. In the modules M11, M12, set wait status registers 41a, 42a and wait status registers 41b, 42b and polling processing units 41c, 42c are provided. The set wait status registers 41a, 42a in the modules M11, M12 can assign settings that continue the operation of the processor core 31 independently from the execution status of the modules M11, M12. The wait status registers 41b, 42b in the modules M11, M12 can assign settings that stop the operation of the processor core 31 depending on the execution status of the individual module M11, M12. The polling processing units 41c, 42c can respectively output polling signals PS11, PS12 that feed the operation of the processor core 31 when the modules M11, M12 receive an access request from the processor core 31 and the modules M11, M12 are executing the processing.

A polling selector 35 and a clock control circuit 36 are also provided in the processor control device. The polling selector 35 enables or disables the polling signals PS11, PS2 outputted from the polling processing units 41c, 42c based on the settings by the set wait status registers 41a, 42a or the wait status registers 41b, 42b. The polling selector 35 can output or stop outputting a wait signal WA2 that halts a clock signal CL2 outputted to the processor core 31 by enabling or disabling the polling signal. The clock control circuit 36 can supply a clock signal CK2 to the processor core 31. The clock control circuit 36 can also stops the clock signal CL2 that is supplied to the processor core 31 according to the wait signal WA2 outputted from the polling selector 35.

Figure 11:
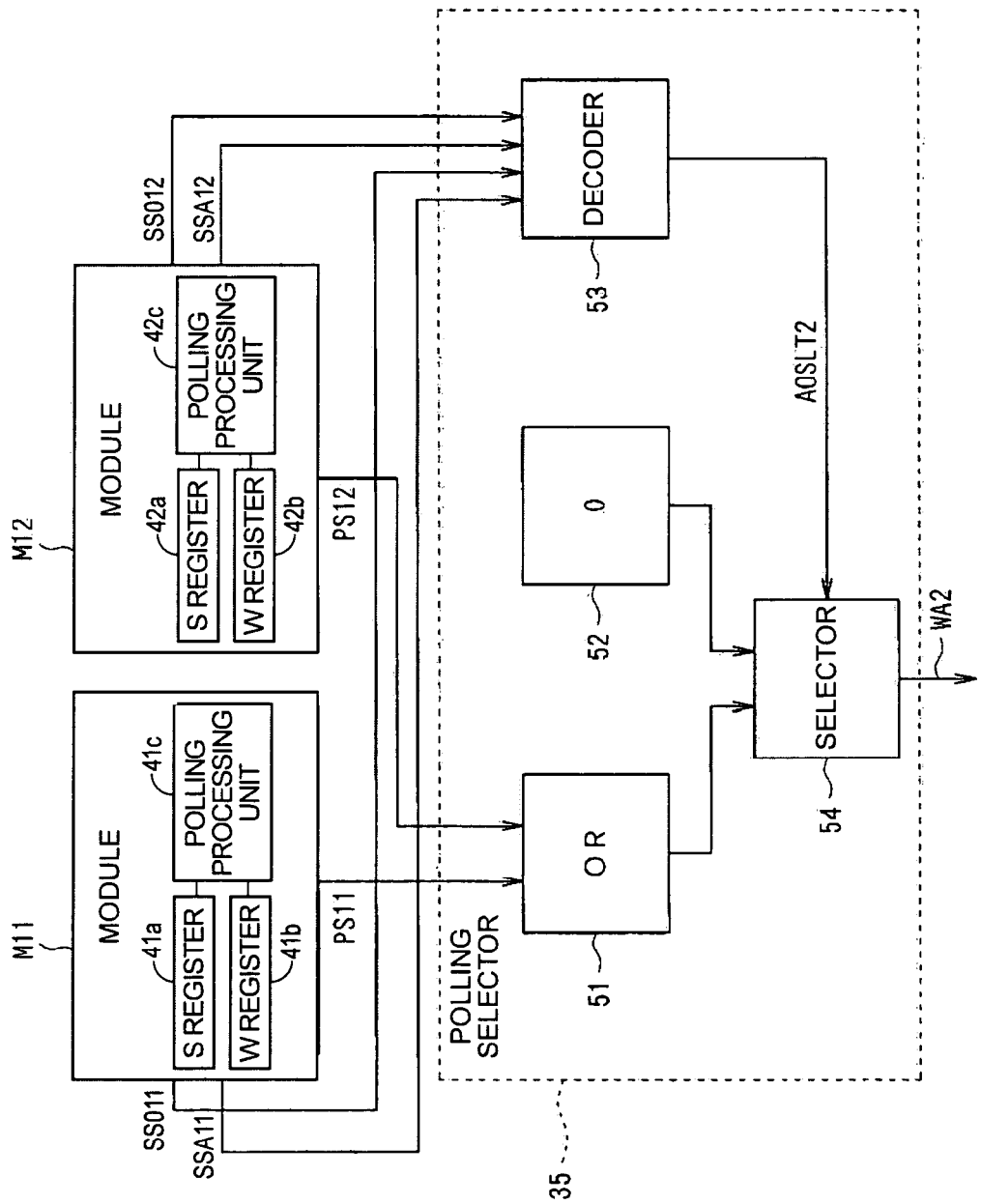
FIG. 11 is a block diagram showing a schematic structure of a polling selector 35 shown in FIG. 10.

FIG. 11 is a block diagram showing a schematic structure of the polling selector 35 shown in FIG. 10.

As shown in FIG. 11, an OR circuit 51, a 0-set circuit 52, a decoder 53 and a selector 54 are provided in the polling selector 35. The polling signals PS11, PS12 outputted from the modules M11, M12 are inputted into the OR circuit 51. The OR circuit 51 calculates a logical sum of the polling signal PS11 and the polling signal PS12, and then outputs the result to the selector 54. The 0-set circuit 52 outputs a signal that disables the wait signal WA2 to the selector 54.

The modules M11, M12 output set wait selection signals SSA11, SSA12 to the decoder 53. The set wait selection signals SSA11, SSA12 correspondingly indicate that the set wait status registers 41a, 42a are read out by the processor core 31. The modules M11, M12 also output wait selection signals SSO11, SSO12 to the decoder 53. The wait selection signals SSO11, SSO12 correspondingly indicate that the wait status registers 41b, 42b are read out by the processor core 31.

The decoder 53 supplies a selection signal AOSLT2 to the selector 54 when at least one of the set wait selection signals SSA11, SSA12 is sent by the modules M11, M12. With the selection signal AOSLT2, the selector 54 selects the output of the 0-set circuit 52. The decoder 53 also supplies the selection signal AOSLT2 to the selector 54 when at least one of the wait selection signals SSO11, SSO12 is sent by the modules M11, M12. In this case, with the selection signal AOSLT2, the selector 54 selects the output of the OR circuit 51.

The selector 54 selects the output of either the OR circuit 51 or the 0-set circuit 52 based on the selection signal AOSLT2 outputted from the decoder 53. The selector 54 then outputs the selected output to the clock control circuit 36 as the wait signal WA2.

The decoder 53 shown in FIG. 11 can operate in the same manner as the decoder 23 shown in FIG. 2. In other words, when the set wait status registers 41a, 42a are read by the processor core 31, the polling processing units 41c, 42c set the set wait selection signals SSA11, SSA12 to "1". The decoder 53 then sets the selection signal AOSLT2 to "0" when at least one of the set wait selection signals SSA11, SSA12 is set to "1". The selector 54 outputs the output of the 0-set circuit 52 to the clock control circuit 36 as the wait signal WA2 when the selection signal AOSLT2 is set to "0".

On the other hand, when the wait status registers 41b, 42b are read by the processor core 31, the polling processing units 41c, 42c set the wait selection signals SSO11, SSO12 to "1". The decoder 53 then sets the selection signal AOSLT2 to "1" when at least one of the wait selection signals SSO11, SSO12 is set to "1". The selector 54 outputs the output of the OR circuit 51 to the clock control circuit 36 as the wait signal WA2 when the selection signal AOSLT2 is set to "1".

Figures 12, 13:
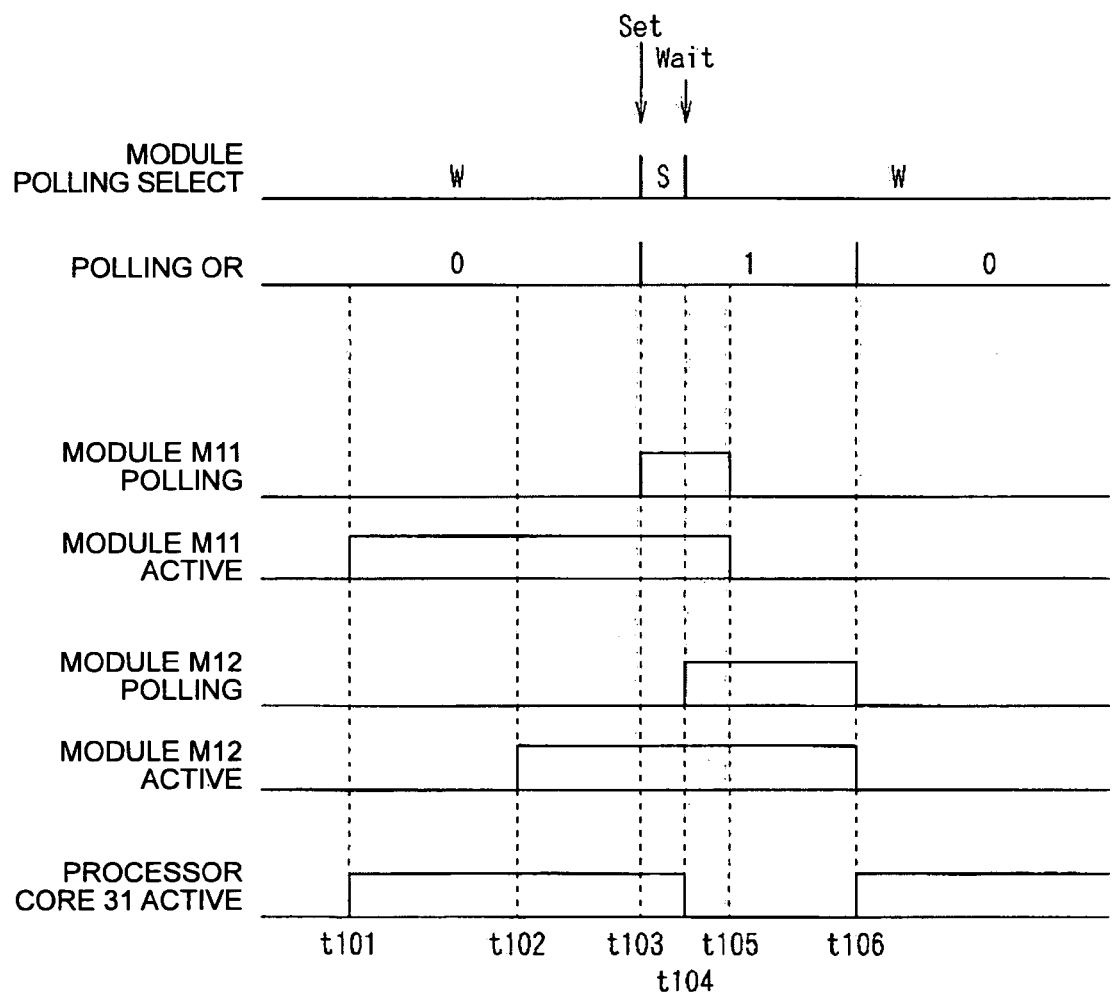
FIG. 12 is a drawing showing a method for selecting multi wait status registers 41a, 42a and single wait status registers 41b, 42b.
FIG. 13 is a drawing showing an example of a polling processing method of the processor control device shown in FIG. 10.

FIG. 12 is a drawing showing a method for selecting the set wait status registers 41a, 42a and the wait status registers 41b, 42b shown in FIG. 10.

As shown in FIG. 12, for example, the set wait status registers 41a, 42a and the wait status registers 41b, 42b may correspond to address lines of the bus. For example, the processor core 31 can select the set wait status registers 41a, 42a by addressing "0x1000014" in the bus address lines. The processor core 31 can also select the wait status registers 41b, 42b by addressing "0x1000018" in the bus address lines.

When an access request is sent from the processor core 31 to the modules M11, M12 as shown in FIG. 10, the polling processing units 41c, 42c judge whether the modules M11, M12 are executing a process or not. If the modules M11, M12 are not executing the process, a non-execution flag informing that the modules M11, M12 are not running the process is read by the processor core 31. The processor core 31 can access the modules M11, M12 when it reads out the non-execution flag from the modules M11, M12.

On the contrary, if the polling processing units 41c, 42c find that the modules M11, M12 are executing the process when the access request from the processor core 31 is sent to the modules M11, M12, the polling processing units 41c, 42c can respectively output the polling signals PS11, PS12 to the polling selector 35. Here, the processor core 31 can select and read out either the set wait status registers 41a, 42a or the wait status registers 41b, 42b at the time of the access request to the modules M11, M12. In a case where the processor core 31 can go to the next process regardless of the processing result of the modules M11, M12 to which the access request has sent, the processor core 31 can read out the set wait status registers 41a, 42a. On the contrary, in a case where the processor core 31 can go to the next process only if it waits the processing result of the modules M11, M12 to which the access request has sent without waiting results of the other modules M11, M12, the processor core 31 can read out the wait status registers 41b, 42b.

As shown in FIG. 3, when the set wait status registers 41a, 42a are read by the processor core 31, the polling processing units 41c, 42c set the set wait selection signals SSA11, SSA12 to "1". The decoder 53 then sets the selection signal AOSLT2 to "0" when at least one of the set wait selection signals SSA11, SSA12 is set to "1". The selector 54 outputs the output of the 0-set circuit 52 to the clock control circuit 36 as the wait signal WA2 when the selection signal AOSLT2 is set to "0".

On the other hand, when the wait status registers 41b, 42b are read by the processor core 31, the polling processing units 41c, 42c set the wait selection signals SSO11, SSO12 to "1". The decoder 53 then sets the selection signal AOSLT2 to "1" when at least one of the wait selection signals SSO11, SSO12 is set to "1". The selector 54 outputs the output of the OR circuit 51 to the clock control circuit 36 as the wait signal WA2 when the selection signal AOSLT2 is set to "1".

When the wait signal WA2 is outputted to the clock control circuit 36, the clock control circuit 36 stops the clock signal CL2 that is supplied to the processor core 31. The polling processing units 41c, 42c monitor the execution status of the corresponding modules M11, M12. When the modules M11, M12 finish the processing, the polling processing units 41c, 42c correspondingly stop outputting the polling signals PS11, PS12.

In the case where the set wait status registers 41a, 42a are read out by the processor core 31, the polling selector 35 stops outputting the wait signal WA2 whether the polling signals PS11, PS12 are outputted from the modules M1, M2 or not.

In the case where the wait status registers 41b, 42b are read out by the processor core 31, the polling selector 35 stops outputting the wait signal WA2 when the output of the polling signals PS11, PS12 from the modules M11, M12 is stopped. The clock control circuit 36 resumes supplying the clock signal CL2 to the processor core 31 when the polling selector 35 stops outputting the wait signal WA2.

As described above, according to the embodiment, it is possible to stop the operation of the processor core 31 until the processing of the modules M11, M12 finishes, and the processor core 31 does not have to judge whether the processing of the modules M11, M12 finished or not when the processor core 31 tries to access the modules M11, M12. Thereby, even in the case where more than one module, the modules M11, M12 are coupled to the processor core 31 through the bus, the processor core 31 does not need to judge which branch to process at the time of the polling processing and does not need to carry out the process of the branch. Accordingly, the processing load imposed on the processor core 31 can be reduced and it is possible to save the power consumed by the processor core 31.

Furthermore, according to the embodiment, the wait status registers 41b, 42b that assign settings to stop the operation of the processor core 31 based on the execution status of the individual module M11, M12, and the set wait status registers 41a, 42a that assign settings to continue the operation of the processor core 31 regardless of the execution status of the modules M11, M12 are provided in each module M11, M12. Thereby, each module M11, M12 can either stop or continue the operation of the processor core 31 independently even if the plurality of the modules M11, M12 is coupled to the processor core 31 through the bus. Accordingly, it is possible to prevent the operation of the processor core 31 from being uniformly stopped when each module M11, M12 is independently operating. Therefore, operation efficiency of the processor core 31 will not be deteriorated and the power consumption by the processor core 31 will be reduced.

FIG. 13 is a timing chart showing an example of a polling processing method of the processor control device shown in FIG. 10.

At a time t101 shown in FIG. 13, the processor core 31 shown in FIG. 10 is in operation and the module M11 is executing the processing. At a time t102, the module M12 starts processing. At a time t103, the processor core 31 issues an access request to the module M11 and then reads out the set wait status register 41a while the modules M11, M12 are executing the processing.

Subsequently, the polling processing unit 41c in the module M11 outputs the polling signal PS11 to the polling selector 35 and sets the set wait selection signal SSA11 to "1". The decoder 53 sets the selection signal AOSLT2 to "0" when the set wait selection signal SSA11 is set to "1". The selector 54 outputs the output of the 0-set circuit 52 to the clock control circuit 36 as the wait signal WA2 when the selection signal AOSLT2 is set to "0". At this point, "0" is outputted from the 0-set circuit 52 all the time and the wait signal WA2 will not be outputted to the clock control circuit 36. Thereby, at the time t103, the clock control circuit 36 keeps supplying the clock signal CL2 to the processor core 31 and the processor core 31 remains in operation.

Next, the processor core 31 issues the access request to the module M12 while the modules M11, M12 are executing the processing, and then the processor core 31 reads out the wait status register 42b at a time t104.

The polling processing unit 42c in the module M12 then outputs the polling signal PS12 to the polling selector 35 and sets the wait selection signal SSO12 to "1". The decoder 53 sets the selection signal AOSLT2 to "1" when the wait selection signal SSO12 is set to "1". The selector 54 outputs the output of the OR circuit 51 to the clock control circuit 36 as the wait signal WA2 when the selection signal AOSLT2 is set to "1". At this point, the output of the OR circuit 51 becomes "1" when the polling signal PS12 is outputted to the polling selector 35 and the wait signal WA2 is outputted to the clock control circuit 36. Thereby, the clock control circuit 36 stops the clock signal CL2 supplied to the processor core 31 at the time t104, and this stops the operation of the processor core 31.

Next, when the processing of the module M11 finishes, the polling processing unit 41c stops outputting the polling signal PS11 at a time t105. Even though the output of the polling signal PS11 from the module M11 is stopped here, the polling signal PS12 is still outputted from the module M12. Thereby, the output from the OR circuit 51 remains "1". Furthermore, the output of the OR circuit 51 is outputted to the clock control circuit 36 as the wait signal WA2 because the wait selection signal SSO12 is set to "1". Accordingly, the supply of the clock signal CL2 that is provided to the processor core 31 from the clock control circuit 36 is kept halting even when the processing of the module M11 finishes, and the operation of the processor core 31 remains suspended.

Next, when the processing of the module M12 finishes, the polling processing unit 42c stops outputting the polling signal PS12 at a time t106. When the output of the polling signal PS12 from the module M12 is ceased, the output form the OR circuit 51 becomes "0". This halts the wait signal WA2 outputted from the clock control circuit 36. Thereby, the clock control circuit 36 resumes supplying the clock signal CL2 to the processor core 31 at the time t106 and this starts the operation of the processor core 31.

Figure 14:
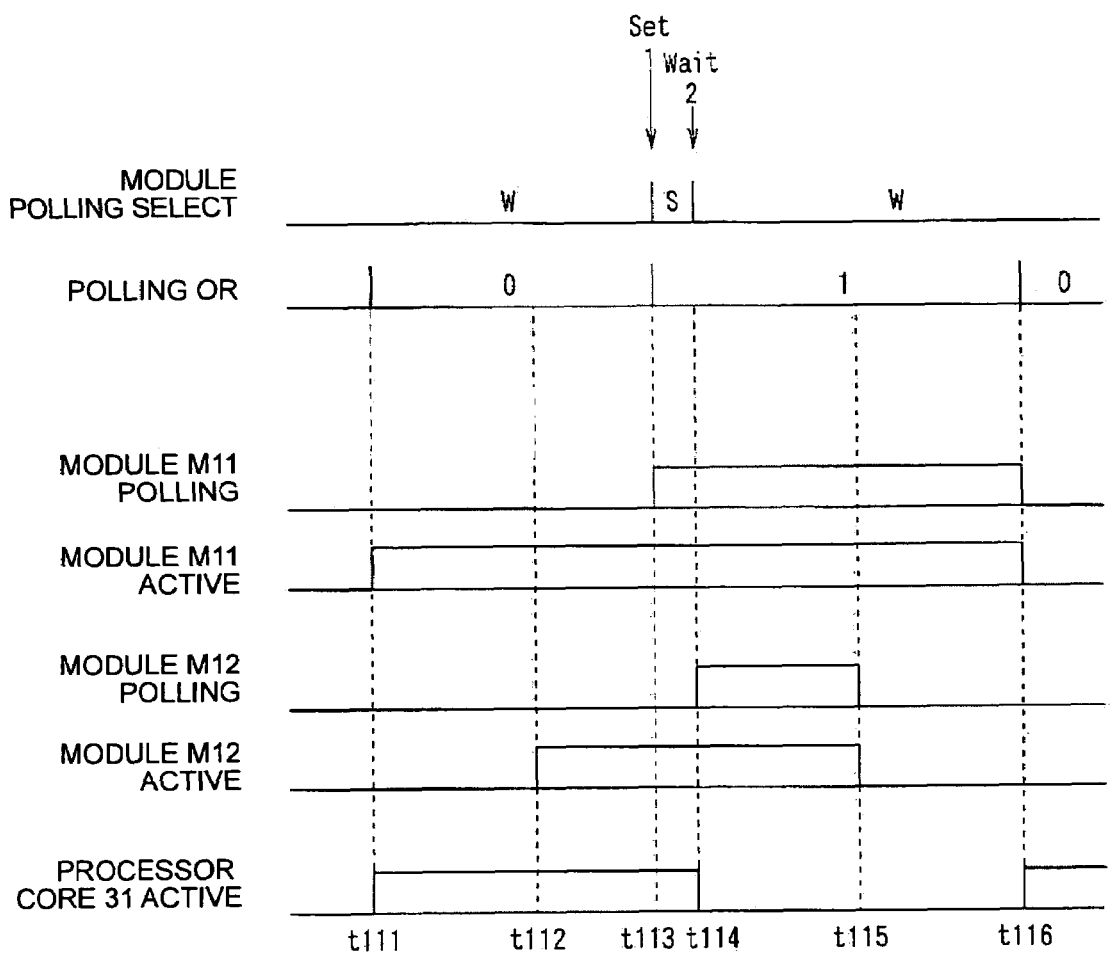
FIG. 14 is a drawing showing another example of the polling processing method of the processor control device shown in FIG. 10.

FIG. 14 is a timing chart showing another example of the polling processing method of the processor control device shown in FIG. 10.

At a time t111 shown in FIG. 14, the processor core 31 shown in FIG. 10 is in operation and the module M11 is executing the processing. At a time t112, the module M12 starts processing. At a time t113, the processor core 31 issues an access request to the module M11 and then reads out the set wait status register 41a while the modules M11, M12 are executing the processing.

Subsequently, the polling processing unit 41c in the module M11 outputs the polling signal PS11 to the polling selector 35 and sets the set wait selection signal SSA11 to "1". The decoder 53 sets the selection signal AOSLT2 to "0" when the set wait selection signal SSA11 is set to "1". The selector 54 outputs the output of the 0-set circuit 52 to the clock control circuit 36 as the wait signal WA2 when the selection signal AOSLT2 is set to "0". At this point, "0" is outputted from the 0-set circuit 52 all the time and the wait signal WA2 will not be outputted to the clock control circuit 36. Thereby, at the time t113, the clock control circuit 36 keeps supplying the clock signal CL2 to the processor core 31 and the processor core 31 remains in operation.

Next, the processor core 31 issues the access request to the module M12 while the modules M11, M12 are executing the processing, and then the processor core 31 reads out the wait status register 42b at a time t114.

The polling processing unit 42c in the module M12 then outputs the polling signal PS12 to the polling selector 35 and sets the wait selection signal SSO12 to "1". The decoder 53 sets the selection signal AOSLT2 to "1" when the wait selection signal SSO12 is set to "1". The selector 54 outputs the output of the OR circuit 51 to the clock control circuit 36 as the wait signal WA2 when the selection signal AOSLT2 is set to "1". At this point, the output of the OR circuit 51 becomes "1" when the polling signal PS12 is outputted to the polling selector 35 and the wait signal WA2 is outputted to the clock control circuit 36. Thereby, the clock control circuit 36 stops the clock signal CL2 supplied to the processor core 31 at the time t114. This halts the operation of the processor core 31.

Next, when the processing of the module M12 finishes, the polling processing unit 42c stops outputting the polling signal PS12 at a time t115. Even though the output of the polling signal PS12 from the module M12 is stopped here, the polling signal PS11 is still outputted from the module M11. Thereby, the output from the OR circuit 51 remains in "1". Furthermore, the output of the OR circuit 51 is outputted to the clock control circuit 36 as the wait signal WA2 because the wait selection signal SSO12 is set to "1". Accordingly, the supply of the clock signal CL2 that is provided to the processor core 31 from the clock control circuit 36 is still halted even when the processing of the module M12 finishes, and the operation of the processor core 31 remains suspended.

Next, when the processing of the module M11 finishes, the polling processing unit 41c stops outputting the polling signal PS11 at a time t116. When the output of the polling signal PS11 from the module M11 is ceased, the output form the OR circuit 51 becomes "0". This halts the wait signal WA2 outputted from the clock control circuit 36. Thereby, the clock control circuit 36 resumes supplying the clock signal CL2 to the processor core 31 at the time t116 and this starts the operation of the processor core 31.

Figure 15:
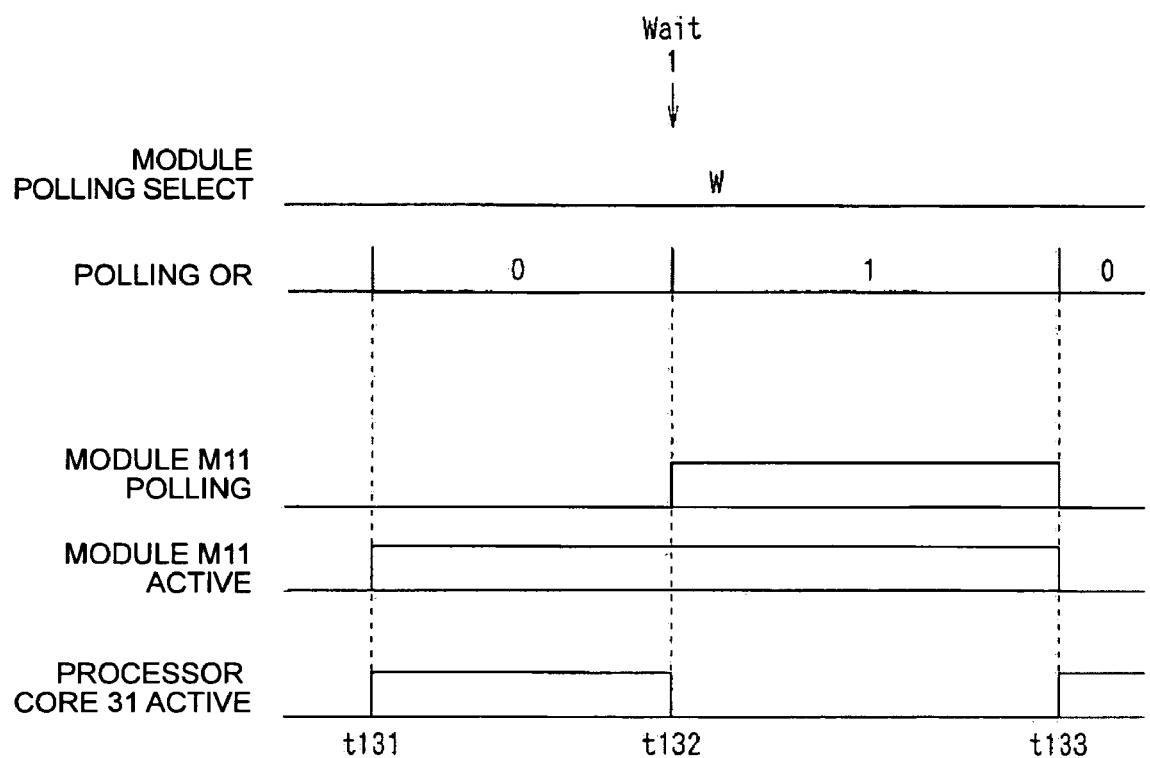
FIG. 15 is a drawing showing another example of the polling processing method of the processor control device shown in FIG. 10.

FIG. 15 is a timing chart showing another example of the polling processing method of the processor control device shown in FIG. 10.

At a time t131 shown in FIG. 15, the processor core 31 shown in FIG. 10 is in operation and the module M11 starts executing the processing. At a time t132, the processor core 31 issues an access request to the module M11 while the module M11 is executing the processing, and then the processor core 31 reads out the wait status register 41b.

Subsequently, the polling processing unit 41c in the module M11 outputs the polling signal PS11 to the polling selector 35 and sets the wait selection signal SSO11 to "1". The decoder 53 sets the selection signal AOSLT2 to "1" when the wait selection signal SSO11 is set to "1". The selector 54 outputs the output of the OR circuit 51 to the clock control circuit 36 as the wait signal WA2 when the selection signal AOSLT2 is set to "1". At this point, the output of the OR circuit 51 becomes "1" when the polling signal PS11 is outputted to the polling selector 35. Accordingly, the wait signal WA2 is outputted to the clock control circuit 36. Thereby, the clock control circuit 36 stops supplying the clock signal CL2 to the processor core 31 at the time t132 and this ceases the operation of the processor core 31.

Next, when the processing of the module M11 finishes, the polling processing unit 41c stops outputting the polling signal PS11 at a time t133. The output of the OR circuit 51 becomes "0" when the output of the polling signal PS11 from the module M11 is halted. This ceases the output of the wait signal WA2 from the clock control circuit 36. Consequently, the clock control circuit 36 resumes supplying the clock signal CL2 to the processor core 31 at the time t133 and this starts the operation of the processor core 31.

Figure 16:
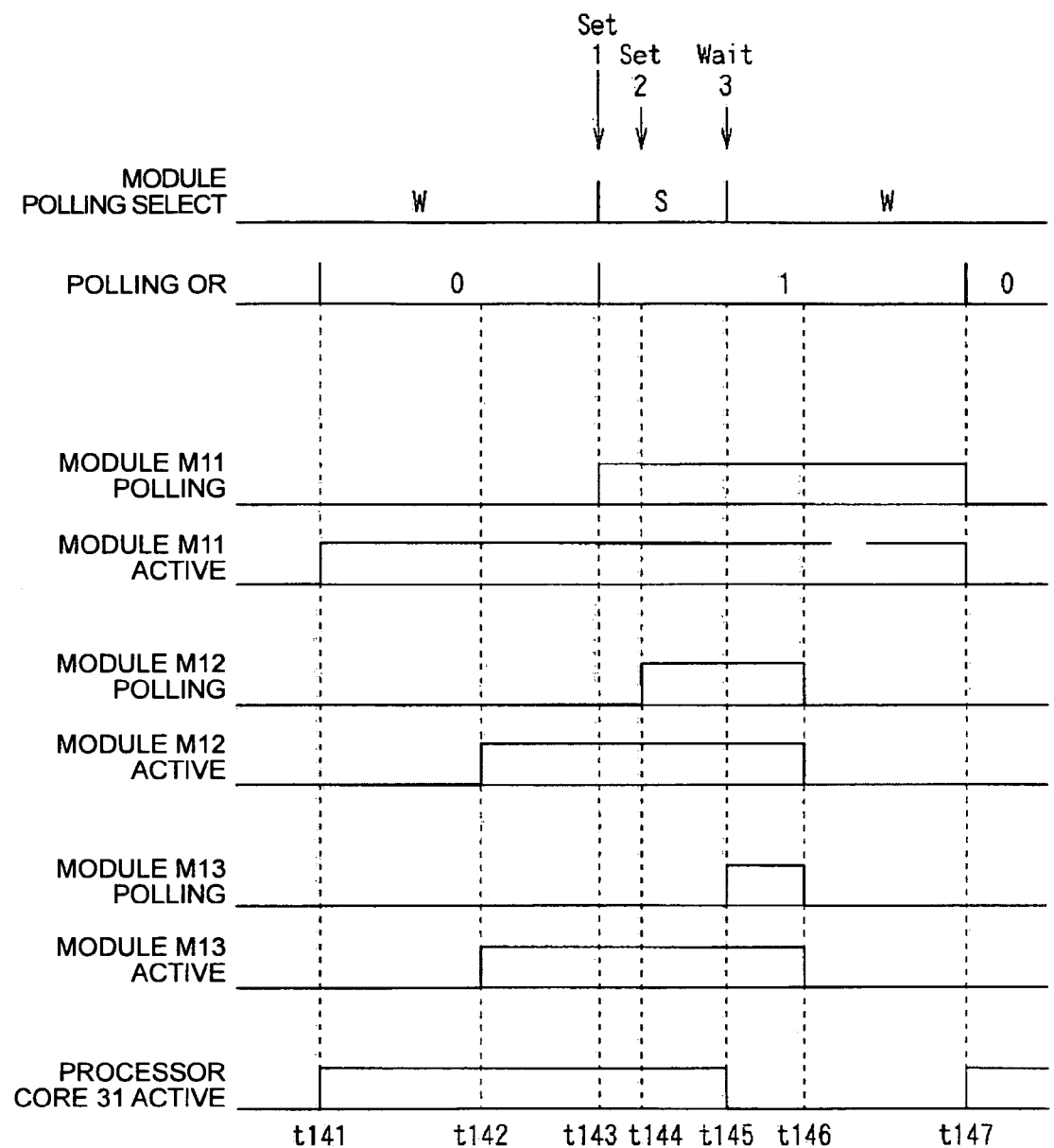
FIG. 16 is a drawing showing another example of the polling processing method of the processor control device shown in FIG. 10.

FIG. 16 is a timing chart showing another example of the polling processing method of the processor control device shown in FIG. 10. In the embodiment shown in FIG. 16, a module M13 is further provided in addition to the modules M11, M12 shown in FIG. 10. The module M13 has a set wait status register 43a, a wait status register 43b and a polling processing unit 43c just like the modules M11, M12 do. The module M13 outputs a polling signal PS13 to the OR circuit 51 and the 0-set circuit 52 shown in FIG. 11. The module M13 also outputs a set wait selection signal SSA13 and a wait selection signal SSO13 to the decoder 53.

At a time t141 shown in FIG. 16, the processor core 31 shown in FIG. 10 is in operation and the module M11 is executing the processing. At a time t142, the modules M12, M13 start executing the processing. At a time t143, the processor core 31 issues an access request to the module M11 while the modules M11, M12, M13 are executing the processing, and then the processor core 31 reads out the set wait status register 41a.

Subsequently, the polling processing unit 41c in the module M11 outputs the polling signal PS11 to the polling selector 35 and sets the set wait selection signal SSA11 to "1". The decoder 53 sets the selection signal AOSLT2 to "0" when the set wait selection signal SSA11 is set to "1". The selector 54 outputs the output of the 0-set circuit 52 to the clock control circuit 36 as the wait signal WA2 when the selection signal AOSLT2 is set to "0". At this point, the output of the 0-set circuit 52 is "0" all the time, and the wait signal WA2 is not outputted to the clock control circuit 36. Thereby, at the time t143, the clock control circuit 36 keeps supplying the clock signal CL2 to the processor core 31 and the processor core 31 remains in operation.

Next, the processor core 31 issues the access request to the module M12 while the modules M11, M12, M13 are executing the processing, and then the processor core 31 reads out the set wait status register 42a at a time t144.

The polling processing unit 42c in the module M12 then outputs the polling signal PS12 to the polling selector 35 and sets the set wait selection signal SSA12 to "1". The decoder 53 sets the selection signal AOSLT2 to "0" when the set wait selection signal SSA12 is set to "1". The selector 54 outputs the output of the 0-set circuit 52 to the clock control circuit 36 as the wait signal WA2 when the selection signal AOSLT2 is set to "0". At this point, the output of the 0-set circuit 52 is "0" all the time, and the wait signal WA2 is not outputted to the clock control circuit 36. Thereby, at the time t144, the clock control circuit 36 keeps supplying the clock signal CL2 to the processor core 31 and the processor core 31 remains in operation.

Next, the processor core 31 issues the access request to the module M13 at a time t145 while the modules M11, M12, M13 are executing the processing and then reads out the wait status register 43b.

Subsequently, the polling processing unit 43c in the module M13 sets the wait selection signal SSO13 to "1". The decoder 53 sets the selection signal AOSLT2 to "1" when the wait selection signal SSO13 is set to "1". The selector 54 outputs the output of the OR circuit 51 to the clock control circuit 36 as the wait signal WA2 when the selection signal AOSLT2 is set to "1". At this point, the output of the OR circuit 51 is "1" because the module M13 is in operation and the polling signal PS13 from the module M13 is still outputted to the polling selector 35. Thereby, the wait signal WA2 is outputted to the clock control circuit 36 when the output of the OR circuit 51 is outputted the clock control circuit 36. Consequently, the clock control circuit 36 stops supplying the clock signal CL2 to the processor core 31 at the time t145 and this ceases the operation of the processor core 31.

Next, when the processing of the modules M12, M13 finishes, the polling processing units 42c, 43c stop outputting the polling signals PS12, PS13 at a time t146. At this point, the polling signal PS11 is still outputted from the module M11 even when the output of the polling signals PS12, PS13 from the modules M12, M13 is halted. Thereby, the output of the OR circuit 51 remains in "1". Furthermore, the wait selection signal SSO13 is "1" so that the output of the OR circuit 51 is outputted to the clock control circuit 36 as the wait signal WA2. Accordingly, the clock signal CL2 supplied to the processor core 31 from the clock control circuit 36 is kept suspended even when the processing of the modules M12, M13 finishes. This means that the operation of the processor core 31 is kept stopping.

Next, when the processing of the module M1 finishes, the polling processing unit 41c stops outputting the polling signal PS11 at a time t147. The output of the OR circuit 51 becomes "0" when the output of the polling signal PS11 from the module M11 is halted. This ceases the output of the wait signal WA2 from the clock control circuit 36. Consequently, the clock control circuit 36 resumes supplying the clock signal CL2 to the processor core 31 at the time t147 and this starts the operation of the processor core 31.

The entire disclosure of Japanese Patent Application Nos. 2005-072429, filed Mar. 15, 2005 and 2005-134991, filed May 6, 2005 are expressly incorporated by reference herein.

What is claimed is:

1. A processor control device, comprising:
   a processor executing an instruction;
   a plurality of modules coupled to the processor through a bus and processing independently from the processor; and
   a plurality of polling processing units coupled respectively to the plurality of modules, the plurality of polling processing units stopping operation of the processor depending on execution statuses of the plurality of modules upon an access request to the plurality of modules from the processor.

2. The processor control device according to claim 1, further comprising:
   a clock control circuit supplying a clock signal to the processor, wherein the plurality of polling processing units outputs a plurality of polling signals to the clock control circuit if each one of the plurality of modules is executing a processing when each one of the plurality of modules receives the access request from the processor, the plurality of polling signals stopping the clock signal supplied to the processor.

3. The processor control device according to claim 2, wherein each one of the plurality of modules includes a single wait status register and a multi wait status register,
   the single wait status register assigning a setting to stop the operation of the processor based on corresponding one of the execution statuses of the plurality of modules, and
   the multi wait status register assigning a setting to stop the operation of the processor based on the execution statuses of the plurality of modules.

4. The processor control device according to claim 3, further comprising:
   a polling selector enabling or disabling the plurality of polling signals outputted from the plurality of polling processing units based on the setting of the single wait status register or the multi wait status register.

5. The processor control device according to claim 4, wherein a first module in the plurality of modules outputs a single wait selection signal to the polling selector in case where the processor reads out the single wait status register of the first module while the first module is executing the processing, the single wait selection signal notifies that the single wait status register is read out by the processor,
   a second module in the plurality of modules outputs a multi wait selection signal to the polling selector in case where the processor reads out the multi wait status register of the second module while the second module is executing the processing, the multi wait selection signal notifies that the multi wait status register is read out by the processor,
   the polling selector outputs a wait signal to the clock control circuit based on one of the polling signal outputted from the first module in case where the single wait selection signal is sent from the first module, the polling selector outputs the wait signal to the clock control circuit based on a plurality of the polling signals outputted from a plurality of the second modules in case where a plurality of the multi wait selection signals is sent from the plurality of the second modules, and the clock control circuit stopping the clock signal according to the wait signal.

6. The processor control device according to claim 2, wherein each one of the plurality of modules includes a wait status register and a set wait status register, the set wait status register assigning a setting to stop the operation of the processor based on corresponding one of the execution statuses of the plurality of modules, and the set wait status register assigning a setting to continue the operation of the processor regardless of corresponding one of execution statuses of the plurality of modules.

7. The processor control device according to claim 6, further comprising:

a polling selector enabling or disabling the plurality of polling signals outputted from the plurality of polling processing units based on the setting of the wait status register or the set wait status register.

8. The processor control device according to claim 7, wherein a first module in the plurality of modules outputs a wait selection signal to the polling selector in case where the processor reads out the wait status register of the first module while the first module is executing the processing, the wait selection signal notifies that the wait status register of the first module is read out, a second module in the plurality of modules outputs a set wait selection signal to the polling selector in case where the processor reads out the set wait status register of the second module while the second module is executing the processing, the set wait selection signal notifies that the set wait status register of the second module is read out, the polling selector outputs a wait signal to the clock control circuit based on the plurality of polling signals outputted from the plurality of modules in case where one of the wait selection signal is sent from the plurality of modules, the polling selector prohibits the output of the wait signal to the clock control circuit regardless of the execution statuses of the plurality of modules in case where the set wait selection signal is sent from the plurality of modules; and the clock control circuit stopping the clock signal according to the wait signal.

* * * * *